US012003799B2

(12) United States Patent
McMillan

(10) Patent No.: US 12,003,799 B2
(45) Date of Patent: Jun. 4, 2024

(54) METHODS AND APPARATUS TO CORRELATE CENSUS MEASUREMENT DATA WITH PANEL DATA

(71) Applicant: The Nielsen Company (US), LLC, New York, NY (US)

(72) Inventor: F. Gavin McMillan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 59 days.

(21) Appl. No.: 17/121,286

(22) Filed: Dec. 14, 2020

(65) Prior Publication Data

US 2021/0176511 A1 Jun. 10, 2021

Related U.S. Application Data

(63) Continuation of application No. 16/167,014, filed on Oct. 22, 2018, now Pat. No. 10,869,075, which is a
(Continued)

(51) Int. Cl.
*H04N 21/258* (2011.01)
*H04N 21/61* (2011.01)

(52) U.S. Cl.
CPC . *H04N 21/25883* (2013.01); *H04N 21/25841* (2013.01); *H04N 21/6175* (2013.01)

(58) Field of Classification Search
CPC ....... H04N 21/25883; H04N 21/25841; H04N 21/6175
(Continued)

(56) References Cited

U.S. PATENT DOCUMENTS 5,796,952 A 8/1998 Davis et al.
5,862,325 A 1/1999 Reed et al.
(Continued)

FOREIGN PATENT DOCUMENTS

CN 101681469 3/2010
CN 102665110 9/2012
(Continued)

OTHER PUBLICATIONS

Indian Patent Office, "First Examination Report," issued in connection with application No. 10165/DELNP/2014, dated Sep. 6, 2018, 6 pages.
(Continued)

*Primary Examiner* — Michael B. Pierorazio

(57) ABSTRACT

Methods, apparatus, and systems are disclosed to correlate census measurement data with panel data. An example system includes accessing means to access a message sent from a requesting device in response to accessing media that includes a tag causing the requesting device to send the message to a monitoring entity with an identification of a geographic location of the requesting device and media identifying information. The example system also includes identification means to determine locations of a plurality of panelist homes and compare the geographic location of the requesting device with the locations of the panelist homes. The example system also includes associating means to identify a user of the requesting device as a panelist residing at the first panelist home and associate the media identifying information with panelist data associated with the first one of the panelist homes.

23 Claims, 14 Drawing Sheets

Related U.S. Application Data continuation of application No. 15/458,399, filed on Mar. 14, 2017, now Pat. No. 10,148,987, which is a continuation of application No. 14/132,626, filed on Dec. 18, 2013, now Pat. No. 9,635,404.

(60) Provisional application No. 61/815,544, filed on Apr. 24, 2013.

(58) Field of Classification Search
USPC .................................................. 725/14
See application file for complete search history.

(56) References Cited

U.S. PATENT DOCUMENTS

| | | | |
|---|---|---|---|
| 6,108,637 A | 8/2000 | Blumenau | |
| 6,138,155 A | 10/2000 | Davis et al. | |
| 6,286,046 B1 | 9/2001 | Dryant | |
| 6,418,470 B2 | 7/2002 | Blumenau | |
| 6,529,952 B1 | 3/2003 | Blumenau | |
| 6,543,051 B1* | 4/2003 | Manson | G08B 27/008 725/108 |
| 6,611,835 B1 | 8/2003 | Huang et al. | |
| 6,677,894 B2 | 1/2004 | Sheynblat et al. | |
| 6,684,240 B1* | 1/2004 | Goddard | H04N 21/4542 707/999.005 |
| 6,708,215 B1 | 3/2004 | Hingorani et al. | |
| 6,745,011 B1 | 6/2004 | Hendrickson et al. | |
| 6,763,386 B2 | 7/2004 | Davis et al. | |
| 6,931,397 B1 | 8/2005 | Sundaresan | |
| 7,200,673 B1 | 4/2007 | Augart | |
| 7,215,280 B1 | 5/2007 | Percy et al. | |
| 7,216,149 B1 | 5/2007 | Briscoe et al. | |
| 7,272,982 B2 | 9/2007 | Neuhauser et al. | |
| 7,299,050 B2 | 11/2007 | Delaney et al. | |
| 7,382,247 B2 | 6/2008 | Welch et al. | |
| 7,451,229 B2 | 11/2008 | Klemets et al. | |
| 7,475,352 B2 | 1/2009 | Yolleck et al. | |
| 7,523,409 B2 | 4/2009 | Yolleck et al. | |
| 7,586,439 B2 | 9/2009 | Percy et al. | |
| 7,600,014 B2 | 10/2009 | Russell et al. | |
| 7,602,277 B1* | 10/2009 | Daly | G08B 27/005 455/414.3 |
| 7,643,564 B2* | 1/2010 | Sheynman | H04L 63/10 725/38 |
| 7,681,215 B2* | 3/2010 | Kim | H04N 21/4383 725/71 |
| 7,739,705 B2 | 6/2010 | Lee et al. | |
| 7,870,279 B2* | 1/2011 | Chuang | H04L 9/40 725/35 |
| 7,917,154 B2 | 3/2011 | Fortescue et al. | |
| 8,020,083 B1 | 9/2011 | Kembel et al. | |
| 8,078,651 B2 | 12/2011 | Desai et al. | |
| 8,078,691 B2 | 12/2011 | Zhang et al. | |
| 8,160,571 B2 | 4/2012 | Griff et al. | |
| 8,181,194 B2 | 5/2012 | Houston | |
| 8,191,007 B1 | 5/2012 | Veloz, III | |
| 8,238,922 B2 | 8/2012 | Parameswar | |
| 8,250,598 B2* | 8/2012 | Velazquez | H04N 21/6405 725/35 |
| 8,351,923 B2 | 1/2013 | Griff et al. | |
| 8,370,489 B2 | 2/2013 | Mazumdar et al. | |
| 8,379,532 B2 | 2/2013 | Griff et al. | |
| 8,401,003 B1 | 3/2013 | Petit-Huguenin et al. | |
| 8,478,904 B2 | 7/2013 | Jungck | |
| 8,499,065 B2 | 7/2013 | Ross et al. | |
| 8,532,607 B2* | 9/2013 | Sennett | H04W 4/02 340/539.18 |
| 8,560,675 B2 | 10/2013 | Honnold et al. | |
| 8,572,645 B2* | 10/2013 | Kim | H04H 20/82 725/38 |
| 8,577,392 B1 | 11/2013 | Pai et al. | |
| 8,607,295 B2 | 12/2013 | Bhatia et al. | |
| 8,631,473 B2 | 1/2014 | Bhatia et al. | |
| 8,635,674 B2 | 1/2014 | Bhatia et al. | |
| 8,667,520 B2 | 3/2014 | Bhatia et al. | |
| 8,682,904 B1 | 3/2014 | Weber | |
| 8,717,608 B2 | 5/2014 | Takahashi | |
| 8,732,737 B1 | 5/2014 | Kalmes et al. | |
| 8,745,655 B2* | 6/2014 | Reddy | H04N 21/814 725/31 |
| 8,806,519 B2* | 8/2014 | Scellato | H04N 21/252 725/46 |
| 8,825,085 B1 | 9/2014 | Boyle et al. | |
| 8,965,326 B2 | 2/2015 | Michaelis et al. | |
| 9,106,976 B2* | 8/2015 | Emerson | H04N 21/47214 |
| 9,635,404 B2 | 4/2017 | McMillan | |
| 9,826,359 B2 | 11/2017 | Splaine et al. | |
| 10,057,718 B2 | 8/2018 | Splaine et al. | |
| 10,148,987 B2 | 12/2018 | McMillan | |
| 10,412,547 B2 | 9/2019 | Splaine et al. | |
| 10,681,497 B2 | 6/2020 | Splaine et al. | |
| 10,869,075 B2 | 12/2020 | McMillan | |
| 11,197,125 B2 | 12/2021 | Splaine et al. | |
| 2001/0021994 A1* | 9/2001 | Nash | H04N 7/163 348/E5.122 |
| 2002/0038349 A1 | 3/2002 | Perla et al. | |
| 2002/0083468 A1* | 6/2002 | Dudkiewicz | H04N 21/4755 348/473 |
| 2002/0124077 A1 | 9/2002 | Hill et al. | |
| 2002/0124252 A1* | 9/2002 | Schaefer | H04N 21/6131 348/E7.071 |
| 2002/0129368 A1* | 9/2002 | Schlack | H04N 21/44016 348/E7.071 |
| 2002/0143933 A1 | 10/2002 | Hind et al. | |
| 2002/0188944 A1* | 12/2002 | Noble | H04N 21/812 725/39 |
| 2002/0188949 A1* | 12/2002 | Wang | H04N 21/4668 725/50 |
| 2003/0018977 A1* | 1/2003 | McKenna | H04N 21/462 725/115 |
| 2003/0066069 A1* | 4/2003 | Mankovich | H04N 21/4431 725/9 |
| 2003/0070167 A1 | 4/2003 | Holtz et al. | |
| 2003/0115301 A1 | 6/2003 | Koskimies | |
| 2003/0187677 A1 | 10/2003 | Malireddy et al. | |
| 2003/0216133 A1* | 11/2003 | Poltorak | G08B 27/008 455/404.1 |
| 2003/0225858 A1 | 12/2003 | Keohane et al. | |
| 2005/0055685 A1* | 3/2005 | Maynard | H04N 21/8193 717/122 |
| 2005/0086685 A1* | 4/2005 | Rahman | H04L 9/40 340/531 |
| 2005/0204379 A1 | 9/2005 | Yamamori | |
| 2006/0075421 A1 | 4/2006 | Roberts et al. | |
| 2006/0212792 A1 | 9/2006 | White et al. | |
| 2006/0234672 A1* | 10/2006 | Adler | H04W 76/50 455/404.1 |
| 2006/0265416 A1 | 11/2006 | Seki et al. | |
| 2007/0047520 A1* | 3/2007 | Byers | H04M 7/006 370/352 |
| 2007/0121651 A1* | 5/2007 | Casey | H04L 67/565 370/466 |
| 2007/0150273 A1* | 6/2007 | Yamamoto | G10L 15/22 704/E15.04 |
| 2007/0162448 A1 | 7/2007 | Jain et al. | |
| 2007/0260589 A1 | 11/2007 | Yugami | |
| 2007/0271375 A1 | 11/2007 | Hwang | |
| 2007/0280446 A1* | 12/2007 | Hsieh | H04L 12/66 379/93.23 |
| 2008/0005686 A1 | 1/2008 | Singh | |
| 2008/0046562 A1 | 2/2008 | Butler | |
| 2008/0086559 A1 | 4/2008 | Davis et al. | |
| 2008/0126420 A1 | 5/2008 | Wright et al. | |
| 2008/0134043 A1* | 6/2008 | Georgis | H04L 67/104 348/E7.071 |
| 2008/0243822 A1 | 10/2008 | Campbell et al. | |
| 2008/0255944 A1 | 10/2008 | Shah et al. | |
| 2008/0313239 A1* | 12/2008 | Byler | G06Q 30/02 |
| 2009/0070797 A1 | 3/2009 | Ramaswamy et al. | |
| 2009/0106362 A1 | 4/2009 | Kuhlke et al. | |

(56) References Cited

U.S. PATENT DOCUMENTS

| | | | |
|---|---|---|---|
| 2009/0150925 A1* | 6/2009 | Henderson | H04N 7/163 725/34 |
| 2009/0158382 A1* | 6/2009 | Shaffer | H04N 21/4825 725/131 |
| 2009/0177768 A1 | 7/2009 | Kind et al. | |
| 2009/0217324 A1* | 8/2009 | Massimi | H04H 60/46 725/9 |
| 2009/0228492 A1 | 9/2009 | Valdez et al. | |
| 2009/0239497 A1* | 9/2009 | Sennett | H04W 76/50 455/404.1 |
| 2009/0247110 A1* | 10/2009 | Sennett | H04W 4/90 340/539.1 |
| 2009/0247114 A1* | 10/2009 | Sennett | H04W 76/50 455/404.1 |
| 2009/0247116 A1* | 10/2009 | Sennett | H04W 4/90 455/404.2 |
| 2009/0271514 A1 | 10/2009 | Thomas et al. | |
| 2009/0300695 A1* | 12/2009 | White | H04N 5/76 725/109 |
| 2009/0328063 A1 | 12/2009 | Corvera et al. | |
| 2010/0058395 A1* | 3/2010 | Goergen | H04N 21/4516 725/58 |
| 2010/0060789 A1* | 3/2010 | Aoki | G09G 5/14 725/33 |
| 2010/0077092 A1 | 3/2010 | Akaboshi | |
| 2010/0131835 A1 | 5/2010 | Kumar et al. | |
| 2010/0185940 A1 | 7/2010 | Popp et al. | |
| 2010/0186029 A1* | 7/2010 | Kim | H04H 20/93 725/33 |
| 2010/0268540 A1 | 10/2010 | Arshi et al. | |
| 2010/0268573 A1 | 10/2010 | Jain et al. | |
| 2010/0312596 A1 | 12/2010 | Saffari et al. | |
| 2010/0313142 A1 | 12/2010 | Brown | |
| 2011/0004682 A1 | 1/2011 | Honnold et al. | |
| 2011/0041090 A1 | 2/2011 | Seolas et al. | |
| 2011/0060845 A1 | 3/2011 | Jungck | |
| 2011/0078703 A1 | 3/2011 | Dokovski et al. | |
| 2011/0082984 A1 | 4/2011 | Yuan | |
| 2011/0087780 A1 | 4/2011 | McCann et al. | |
| 2011/0088058 A1* | 4/2011 | Velazquez | H04N 21/64322 725/33 |
| 2011/0107241 A1 | 5/2011 | Moore | |
| 2011/0119100 A1 | 5/2011 | Ruhl et al. | |
| 2011/0126251 A1* | 5/2011 | LaFreniere | H04N 21/4788 725/110 |
| 2011/0126257 A1* | 5/2011 | Goergen | H04N 21/4532 725/132 |
| 2011/0131604 A1* | 6/2011 | Van Hoff | H04N 9/8042 725/38 |
| 2011/0202888 A1 | 8/2011 | Rusu et al. | |
| 2011/0246641 A1 | 10/2011 | Pugh et al. | |
| 2011/0251902 A1 | 10/2011 | Nagaraiavva | |
| 2012/0030338 A1 | 2/2012 | Zhang et al. | |
| 2012/0047203 A1 | 2/2012 | Brown et al. | |
| 2012/0059696 A1 | 3/2012 | Theberge et al. | |
| 2012/0066378 A1 | 3/2012 | Lui et al. | |
| 2012/0102522 A1* | 4/2012 | Long | H04W 76/50 725/33 |
| 2012/0158954 A1 | 6/2012 | Heffernan et al. | |
| 2012/0174144 A1 | 7/2012 | Flores Xavier et al. | |
| 2012/0239407 A1 | 9/2012 | Lvnch et al. | |
| 2012/0278331 A1 | 11/2012 | Campbell et al. | |
| 2012/0295581 A1 | 11/2012 | Agarwal | |
| 2012/0315839 A1 | 12/2012 | Mumcuoglu et al. | |
| 2012/0324101 A1 | 12/2012 | Peciack et al. | |
| 2013/0014136 A1* | 1/2013 | Bhatia | H04N 21/4788 725/9 |
| 2013/0036434 A1 | 2/2013 | Shkedi et al. | |
| 2013/0072150 A1 | 3/2013 | Williamson et al. | |
| 2013/0097311 A1 | 4/2013 | Mazumdar et al. | |
| 2013/0111512 A1* | 5/2013 | Scellato | H04N 21/252 725/14 |
| 2013/0151339 A1 | 6/2013 | Kim et al. | |
| 2013/0212188 A1 | 8/2013 | Duterque et al. | |
| 2013/0274936 A1* | 10/2013 | Donahue | H02J 13/00034 700/291 |
| 2013/0281047 A1* | 10/2013 | Daly | H04H 20/71 455/404.1 |
| 2013/0311478 A1 | 11/2013 | Frett et al. | |
| 2013/0332962 A1* | 12/2013 | Moritz | H04N 21/44218 725/46 |
| 2014/0019589 A1 | 1/2014 | Ross et al. | |
| 2014/0068411 A1 | 3/2014 | Ross et al. | |
| 2014/0148116 A1* | 5/2014 | Alman | H04W 4/90 455/404.1 |
| 2014/0201766 A1 | 7/2014 | Stepanov et al. | |
| 2014/0244997 A1* | 8/2014 | Goel | H04W 12/084 713/155 |
| 2014/0278934 A1 | 9/2014 | Gutierrez | |
| 2014/0325551 A1 | 10/2014 | McMillan | |
| 2015/0032905 A1 | 1/2015 | Celebi et al. | |
| 2015/0098554 A1 | 4/2015 | Winterbottom et al. | |
| 2016/0112522 A1 | 4/2016 | Abello et al. | |
| 2016/0323706 A1 | 11/2016 | Splaine et al. | |
| 2018/0359605 A1 | 12/2018 | Splaine et al. | |
| 2019/0378161 A1 | 12/2019 | Gutierrez | |

FOREIGN PATENT DOCUMENTS

| | | |
|---|---|---|
| EP | 2512150 | 10/2012 |
| EP | 2989801 | 1/2018 |
| JP | 2005166041 | 6/2005 |
| JP | 2012216196 | 11/2012 |
| JP | 2014505293 | 2/2014 |
| JP | 2014044583 | 3/2014 |
| KR | 20110026300 | 3/2011 |
| KR | 20120082390 | 7/2012 |
| KR | 20120126101 | 11/2012 |
| WO | 2012128895 | 9/2012 |

OTHER PUBLICATIONS

European Patent Office, "Communicaton under Rule 71 (3) EPC," issued in connection with European Patent Application No. 14787754. 2, dated Sep. 28, 2017, 58 pages.

Canadian Intellectual Property Office, "Office Action," issued in connection with Canadian Patent Application No. 2,875,431, dated Dec. 21, 2016, 4 pages.

European Patent Office, "Extended Search Report," issued in connection with European Patent Application No. 14787754.2, dated Jan. 3, 2017, 7 pages.

Instituto Mexicano De La Propiedad Industrial, "Notice of Allowance," issued in connection with Mexican Patent Application No. MX/a/2014/014736, dated Jul. 13, 2016, 2 pages.

European Patent Office, "Communication pursuant to Rules 161(2) and 162 EPC," issued in connection with European Patent Application No. 14787754.2, dated Dec. 1, 2015, 2 pages.

Canadian Intellectual Property Office, "Office Action," issued in connection with Canadian Patent Application No. 2,875,431, dated Dec. 2, 2015, 5 pages.

IP Australia, "Notice of Grant," issued in connection with Australian Application No. 2014257017, dated Feb. 25, 2016, 1 page.

IP Australia, "Notice of Acceptance," issued in connection with Australian Application No. 2014257017, dated Oct. 28, 2015, 2 pages.

International Searching Authority, "International Preliminary Report on Patentability," issued in connection with Application No. PCT/US2014/035332, dated Nov. 5, 2015, 8 pages.

IP Australia, "Patent Examination Report No. 1," issued in connection with Australian Application No. 2014257017, dated May 20, 2015, 2 pages.

International Searching Authority, "International Search Report and Written Opinion of the International Searching Authority," issued in connection with International Patent Application No. PCT/US2014/035332, dated Aug. 22, 2014, 11 pages.

The State Intellectual Property Office of China, "First Notification of Office Action," issued in Connection with Chinese Patent Application No. 201480001436.0, dated Mar. 20, 2017, 27 pages.

(56) References Cited

OTHER PUBLICATIONS

United States Patent and Trademarks Office, "Non-Final Office Action," issued in connection with U.S. Appl. No. 14/132,626, dated Jan. 13, 2015, 36 pages.
United States Patent and Trademarks Office, "Final Office Action," issued in connection with U.S. Appl. No. 14/132,626, dated May 19, 2016, 48 pages.
United States Patent and Trademarks Office, "Non-Final Office Action," issued in connection with U.S. Appl. No. 14/132,626, dated Nov. 30, 2015, 42 pages.
United States Patent and Trademarks Office, "Final Office Action," issued in connection with U.S. Appl. No. 14/132,626, dated Jun. 4, 2015, 31 pages.
United States Patent and Trademarks Office, "Notice of Allowance," issued in connection with U.S. Appl. No. 14/132,626, dated Dec. 6, 2016, 38 pages.
United States Patent and Trademarks Office, "Notice of Allowability," issued in connection with U.S. Appl. No. 14/132,626, dated Mar. 16, 2017, 11 pages.
Canadian Intellectual Property Office, "Notice of Allowance," issued in connection with Canadian Application No. 2,875,431, dated Jul. 24, 2017, 1 page.
Japan Intellectual Property Office, "Notice of Allowance," issued in connection with Japanese Patent Application No. 2015-0524518, dated Mar. 22, 2016, 3 pages.
Instituto Mexicano De La Propiedad Industrial, "Office Action," issued in connection with Mexican Patent Application No. MX/a/2014/014736, dated Apr. 15, 2016, 2 pages.
State Intellectual Property Office of China, "Notice of Decision of Granting of Patent," issued in connection with Chinese Patent Application No. 201480001436.0, dated Sep. 4, 2017, 5 pages.
United States Patent and Trademarks Office, "Notice of Allowance," issued in connection with U.S. Appl. No. 15/458,399, dated Jul. 16, 2018, 8 pages.
United States Patent and Trademarks Office, "Non-final Office Action," issued in connection with U.S. Appl. No. 15/458,399, dated Mar. 12, 2018, 10 pages.
European Patent Office, "Communication Pursuant to Rules 70(2) and 70a{2} EPC," issued in connection with European Patent Application No. 14787754.2, dated Jan. 20, 2017, 1 page.
European Patent Office, "Decision to Grant," issued in connection with European Patent Application No. 14787754.2, dated Jan. 5, 2018, 2 pages.
United States Patent and Trademarks Office, "Non-final Office Action," issued in connection with U.S. Appl. No. 16/167,014, dated Apr. 28, 2020, 23 pages.
United States Patent and Trademarks Office, "Notice of Allowance," issued in connection with U.S. Appl. No. 16/167,014, dated Aug. 14, 2020, 8 pages.
Indian Patent Office, "Hearing Notice," issued in connection with application No. 10165/DELNP/2014, dated on Dec. 9, 2020, 2 pages.
International Searching Authority, "International Search Report and the Written Opinion of the International Searching Authority," issued in connection with corresponding International Patent Application No. PCT/US2014/029803, mailed Aug. 26, 2014, 7 pages.
International Searching Authority, "International Preliminary Report on Patentability," issued in connection with corresponding International Patent Application No. PCT/US2014/029803, Sep. 15, 2015, 5 pages.
Scripting and Ajax, published by WrC.org published 2010, edited by Dominique Hazael-Massieux, retrieved from <http://www.w3.org/standards/webdesign/script.Html>, 3 pages.
United States Patent and Trademark Office, "Non-Final Office Action," issued in connection with U.S. Appl. 13/841,762, Jan. 30, 2015, 32 pages.
United States Patent and Trademark Office, "Non-Final Office Action," issued in connection with U.S. Appl. No. 13/841,762, Aug. 28, 2015, 37 pages.
United States Patent and Trademark Office, "Non-Final Office Action," issued in connection with U.S. Appl. No. 12/895,288, dated Jul. 5, 2012, 12 pages.
United States Patent and Trademark Office, "Notice of Allowance," issued in connection with U.S. Appl. No. 12/895,288, dated Mar. 29, 2013, 11 pages.
United States Patent and Trademark Office, "Restriction Requirement", issued in connection with U.S. Appl. No. 13/953,176, dated Aug. 22, 2014, 6 pages.
United States Patent and Trademark Office, "Non-Final Office Action", issued in connection with U.S. Appl. No. 13/953,176, dated Nov. 6, 2014, 7 pages.
United States Patent and Trademark Office, "Non-Final Office Action," issued in connection with U.S. Appl. No. 13/630,818, Nov. 24, 2014, 23 pages.
United States Patent and Trademark Office, "Final Office Action," issued in connection with U.S. Appl. No. 13/630,818, Apr. 9, 2015, 29 pages.
United States Patent and Trademark Office, "Non-Final Office Action," issued in connection with U.S. Appl. No. 13/630,818, Sep. 16, 2015, 44 pages.
United States Patent and Trademark Office, "Final Office Action," issued in connection with U.S. Appl. No. 13/841,762, Mar. 25, 2016, 26 pages.
United States Patent and Trademark Office, "Final Office Action," issued in connection with U.S. Appl. No. 13/841,762, Dec. 29, 2016, 33 pages.
United States Patent and Trademark Office, "Non-Final Office Action," issued in connection with U.S. Appl. No. 14/880,381, Feb. 1, 2017, 7 pages.
United States Patent and Trademark Office, "Notice of Allowance," issued in connection with U.S. Appl. No. 14/880,381, on Jul. 19, 2017, 5 pages.
United States Patent and Trademark Office, "Final Office Action", issued in connection with U.S. Appl. No. 13/630,818, Apr. 4, 2017, 58 pages.
United States Patent and Trademark Office, "Non-Final Office Action," issued in connection with U.S. Appl. No. 13/841,762, on Sep. 14, 2017, 38 pages.
United States Patent and Trademark Office, "Final Office Action," issued in connection with U.S. Appl. No. 13/841,762, Mar. 12, 2018, 36 pages.
United States Patent and Trademark Office, "Notice of Allowance," issued in connection with U.S. Appl. No. 15/818,715, on Apr. 19, 2018, 7 pages.
United States Patent and Trademark Office, "Non-Final Office Action," issued in connection with U.S. Appl. No. 15/818,715, on Dec. 26, 2017, 7 pages.
United States Patent and Trademark Office, "Non-Final Office Action," issued in connection with U.S. Appl. No. 16/105,805, on Sep. 14, 2018, 8 pages.
United States Patent and Trademark Office, "Final Office Action," issued in connection with U.S. Appl. No. 16/105,805, on Feb. 19, 2019, 7 pages.
United States Patent and Trademark Office, "Notice of Allowance," issued in connection with U.S. Appl. No. 16/105,805, on Apr. 26, 2019, 8 pages.
United States Patent and Trademark Office, "Non-Final Office Action," issued in connection with U.S. Appl. No. 16/565,372, on Oct. 15, 2019, 12 pages.
United States Patent and Trademark Office, "Notice of Allowance and Fee(s) Due," issued in connection with U.S. Appl. No. 16/565,372, on Jan. 31, 2020, 17 pages.
United States Patent and Trademark Office, "Non-Final Office Action," issued in connection with U.S. Appl. No. 16/005,650, on May 11, 2020, 32 pages.
United States Patent and Trademark Office, "Final Office Action," issued in connection with U.S. Appl. No. 16/005,560, mailed on Sep. 10, 2020, 33 pages.
United States Patent and Trademark Office, "Non-Final Office Action," issued in connection with U.S. Appl. No. 16/005,650, mailed on Feb. 23, 2021, 27 pages.

(56) References Cited

OTHER PUBLICATIONS

United States Patent and Trademark Office, "Non-Final Office Action," issued in connection with U.S. Appl. No. 16/896,176, mailed on Dec. 7, 2020, 9 pages.
United States Patent and Trademark Office, "Final Office Action," issued in connection with U.S. Appl. No. 16/896,176, mailed on May 11, 2021, 7 pages.
United States Patent and Trademark Office, "Notice of Allowance and Fee(s) Due," issued in connection with U.S. Appl. No. 16/896,176, mailed on Aug. 3, 2021, 7 pages.
M. Thomson, et al., HTTP Geolocation, Internet-Draft, Mar. 7, 2011, pp. 1-10, GeoPriv, 10 pages.
Stack Overflow, Is it Possible to get a (rough) Mobile Phone Location from a HTTP Request, Article, Jan. 7, 2010, 2 pages.
Yong Wang, et al., Towards Street-Level Client-Independent IP Geolocation, Article, pp. 1-14, 14 pages.
United States Patent and Trademark Office, "Non-Final Office Action," issued in connection with U.S. Appl. No. 14/880,381, mailed on Feb. 1, 2017, 7 pages.
United States Patent and Trademark Office, "Non-Final Office Action," issued in connection with U.S. Appl. No. 15/818,715, mailed on Dec. 26, 2017, 8 pages.
United States Patent and Trademark Office, "Final Office Action," issued in connection with U.S. Appl. No. 16/105,805, mailed on Feb. 19, 2019, 7 pages.
United States Patent and Trademark Office, "Non-Final Office Action," issued in connection with U.S. Appl. No. 16/105,805, mailed on Sep. 14, 2018, 9 pages.
United States Patent and Trademark Office, "Non-Final Office Action," issued in connection with U.S. Appl. No. 16/565,372, mailed on Oct. 15, 2019, 7 pages.
United States Patent and Trademark Office, "Non-Final Office Action," issued in connection with U.S. Appl. No. 16/896,176, mailed on Dec. 7, 2020, 10 pages.
United States Patent and Trademark Office, "Non-Final Office Action," issued in connection with U.S. Appl. No. 17/543,648, mailed on Nov. 20, 2023, 10 pages.

\* cited by examiner

| REQUESTED WEBSITE | DEVICE LOCATION | TIMESTAMP | POSSIBLE PANEL DATA? |
|---|---|---|---|
| HOST1.COM | 41.87989, -87.637158 | 11/10/2013 9:15:00 AM | YES |
| HOST2.COM | N/A | 11/10/2013 9:45:05 AM | NO |
| HOST3.COM | 42.031022, -88.033502 | 11/11/2013 8:47:16 PM | YES |
| HOST2.COM | 41.87989, -87.637158 | 11/15/2013 10:12:06 PM | YES |
| HOST4.COM | 39.739167, -104.984722 | 11/20/2013 11:59:49 AM | YES |

FIG. 5

| PANELIST IDENTIFIER 602 | REFERENCE TYPE 603 | REFERENCE LOCATION 604 | REFERENCE AREA 605 | GENDER 606 | AGE 608 | CITY OF RESIDENCE 610 | RELATIONSHIP STATUS 612 |
|---|---|---|---|---|---|---|---|
| 10001 | DUPLEX | 41.87989, -87.637160 | RADIUS = 12 FEET | M | 50-54 | CHICAGO ILLINOIS | MARRIED |
| 10002 | HOUSE | 41.748056, -88.165556 | RADIUS = 30 FEET | F | 35-39 | NAPERVILLE ILLINOIS | MARRIED |
| 10003 | APARTMENT | 39.739166, -104.984720 | RADIUS = 13 FEET | F | 18-34 | DENVER COLORADO | SINGLE |
| 10003 | GYM | 39.711433, -104.938967 | RADIUS = 45 FEET | F | 18-34 | DENVER COLORADO | SINGLE |
| 10003 | VACATION HOME | 28.415833, -81.298889 | RADIUS = 36 FEET | F | 18-34 | ORLANDO FLORIDA | SINGLE |

600

616 → (row 1), 618 → (row 2), 620 → (row 3), 622 → (row 4), 624 → (row 5)

FIG. 6

| CENSUS OR PANEL DATA? | PANELIST IDENTIFIER | REQUESTED WEBSITE | DEVICE LOCATION | TIMESTAMP | CITY OF RESIDENCE |
|---|---|---|---|---|---|
| PANEL | 10001 | HOST1.COM | 41.87989, -87.637158 | 11/10/2013 9:15:00 AM | CHICAGO ILLINOIS |
| CENSUS | N/A | HOST2.COM | N/A | 11/10/2013 9:45:05 AM | N/A |
| CENSUS | N/A | HOST3.COM | 42.031022, -88.033502 | 11/11/2013 8:47:16 PM | N/A |
| PANEL | 10001 | HOST2.COM | 41.87989, -87.637158 | 11/15/2013 10:12:06 PM | CHICAGO ILLINOIS |
| PANEL | 10003 | HOST4.COM | 39.739167, -104.984722 | 11/20/2013 11:59:49 AM | DENVER COLORADO |

FIG. 7

METHODS AND APPARATUS TO CORRELATE CENSUS MEASUREMENT DATA WITH PANEL DATA

RELATED APPLICATION

This patent arises from a continuation of U.S. patent application Ser. No. 16/167,014, filed Oct. 22, 2018, now U.S. Pat. No. 10,869,075, which arises from a continuation of U.S. patent application Ser. No. 15/458,399, filed Mar. 14, 2017, now U.S. Pat. No. 10,148,987, which arises from a continuation of U.S. patent application Ser. No. 14/132,626, filed Dec. 18, 2013, now U.S. Pat. No. 9,635,404, which claims the benefit of U.S. Provisional Patent Application No. 61/815,544, filed on Apr. 24, 2013. U.S. patent application Ser. No. 16/167,014, U.S. patent application Ser. No. 15/458,399, U.S. patent application Ser. No. 14/132,626, and U.S. Provisional Patent Application No. 61/815,544 are hereby incorporated by reference in their entireties. Priority to U.S. patent application Ser. No. 16/167,014, U.S. patent application Ser. No. 15/458,399, U.S. patent application Ser. No. 14/132,626, and U.S. Provisional Patent Application No. 61/815,544 is hereby claimed.

FIELD OF THE DISCLOSURE

This disclosure relates generally to audience measurement, and, more particularly, to methods and apparatus to correlate census measurement data with panel data.

BACKGROUND

Audience measurement of media (e.g., any type of content and/or advertisements such as broadcast television and/or radio, stored audio and/or video played back from a memory such as a digital video recorder or a digital video disc, a webpage, audio and/or video presented (e.g., streamed) via the Internet, a video game, etc.) often involves collection of media identifying data (e.g., signature(s), fingerprint(s), code(s), tuned channel identification information, time of exposure information, etc.) and people data (e.g., user identifier(s), demographic data associated with audience member(s), etc.). The media identifying data and the people data can be combined to generate, for example, media exposure data indicative of amount(s) and/or type(s) of people that were exposed to specific piece(s) of media.

BRIEF DESCRIPTION OF THE DRAWINGS

FIG. 5 is an example data table storing data representing tagged media impressions that may be collected by the example audience measurement entity server of FIGS. 1-4.

FIG. 6 is an example data table that may be stored by the audience measurement entity server of FIGS. 1-4.

FIG. 7 is an example data table storing data representing tagged media impressions correlated with panel samples that may be collected by the example audience measurement entity server of FIGS. 1-4.

DETAILED DESCRIPTION

Figure 1:
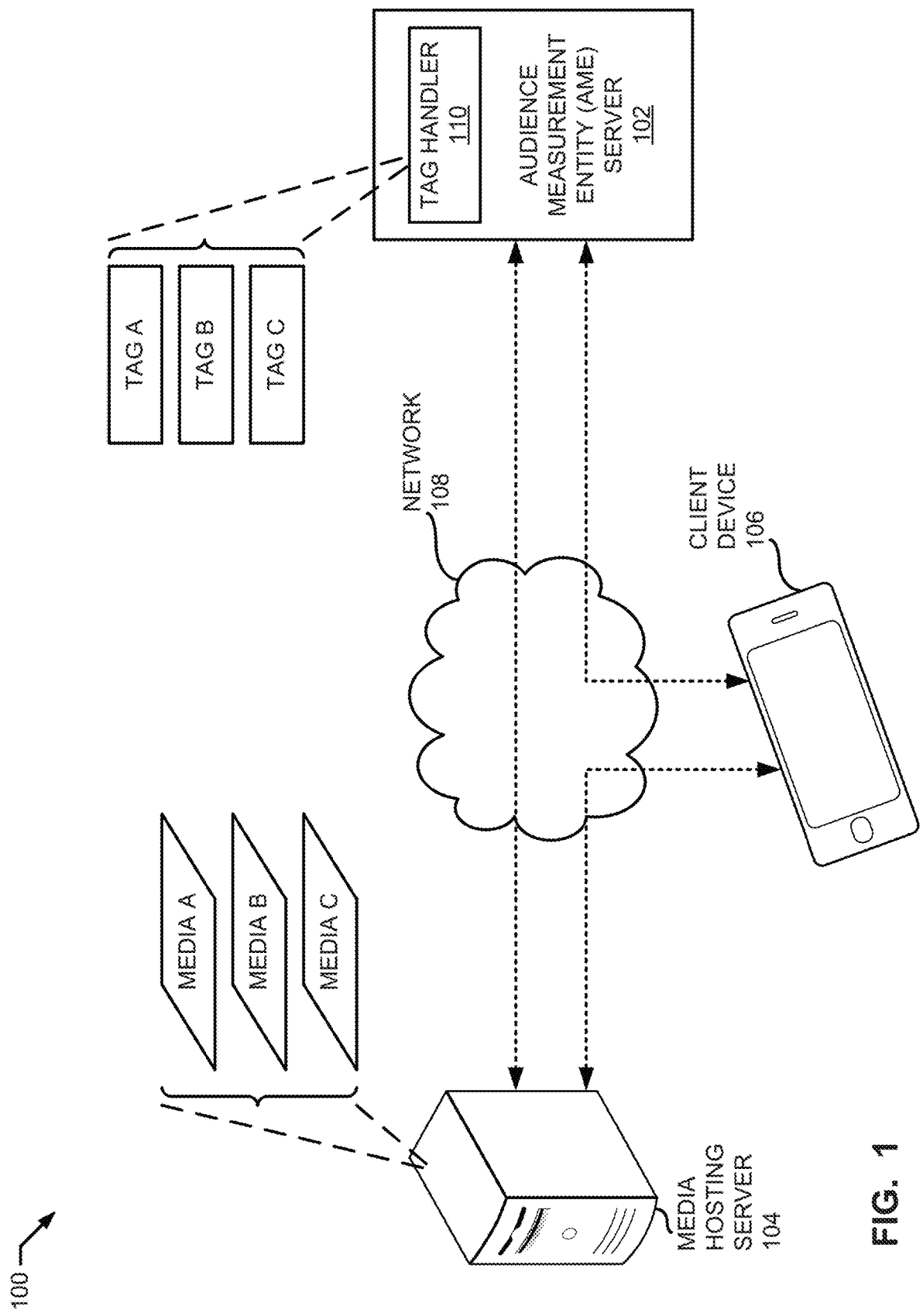
FIG. 1 is a diagram of an example system constructed in accordance with the teachings of this disclosure to correlate census measurement data with panel data.

Example methods, systems and apparatus disclosed herein may be used to measure audience exposure and/or interaction with online media accessed by users. For example, techniques disclosed herein enable correlating census measurement data in panel samples.

Monitoring impressions of online media (e.g., website content, audio, video text, etc. such as an advertisement, a streaming program, etc.) is useful for generating impression statistics for the online media. As used herein, an impression is defined to be an event in which a home or individual is exposed to the corresponding media (e.g., content and/or advertisement). Thus, an impression represents a home or an individual having been exposed to media (e.g., an advertisement, content, a group of advertisements and/or a collection of content). A quantity of impressions or impression count, with respect to online media, is the total number of times media (e.g., an advertisement, an advertisement campaign, a streaming program, etc.) has been accessed by a web population (e.g., the number of times the media is accessed as decreased by, for example, pop-up blockers and/or increased by, for example, retrieval from local cache memory). A user device (e.g., a mobile device), via a browser that renders media or a non-browser based application that presents media, requests the online media from a media provider (e.g., one or more content providers and/or advertising entities) by sending a hypertext transfer protocol (HTTP) request to an Internet address defined by a uniform resource locator (URL) specified by the media provider (e.g., a content provider and/or advertising entity). To enable monitoring of user access to Internet resources, in some examples, participating media providers (e.g., publishers of websites, advertisement providers, etc.) insert or embed a tag within the source (e.g., Hypertext Markup Language (HTML) code) of their respective media. The tag may include Java, JavaScript and/or other executable instructions, which cause the media access to be recorded by an audience measurement entity when the tag executes on a requesting mobile device.

Methods, apparatus and systems for tagging media in t inner described above are disclosed in U.S. Pat. No. 6,108, 637, by Blumenau, entitled "Content Display Monitor," which is hereby incorporated by reference in its entirety. Because a tag is embedded in the HTML defining a webpage and/or referenced by a pointer in the HTML of a webpage, the tag is executed whenever a web browser renders the corresponding media (e.g., the webpage). Typically, a tag will cause the browser to send a request (sometimes referred to herein as a beacon) to a data collection facility such as an audience measurement entity server that is associated with the audience measurement entity. In some examples, the beacon is an HTTP request (e.g., an HTML, GET request, an HTML POST request, etc.). The beacon enables monitoring data reflecting information about the media access to be tracked. To this end, the beacon carries identification information to be collected, compiled and/or analyzed at the audience measurement entity. The identification information may include a user agent string to identify the user device on which the media is requested, a media identifier to identify the media with which the tag is associated (e.g., a website address), a host identifier to identify the host (e.g., web server) with which the requested media is associated (e.g., a vendor identifier (VI))), a timestamp to identify the dates/times at which the media is requested, accessed and/or received, one or more command identifiers identifying control commands (e.g., pause, play, stop, etc.) acted upon the media, etc.

Tags such as those described above may facilitate the collection of census like data. In other words, because every (or nearly every) browser that accesses the tagged media will respond to the tag by sending the beacon (or communication) to the audience measurement entity, every (or nearly every) access to the online media (even to cached media using such tags) will be known by the audience measurement entity. Moreover, the collection of this data does not require the use of a special browser, or of special metering software, at the user devices. Rather, because a beacon may appear to a conventional commercially available browser (e.g., Mozilla® Firefox®, Microsoft® Internet Explorer®, Google Chrome™ browser, etc.) as any other request to retrieve Internet media (e.g., as a request to obtain content or advertisement material to be displayed as part of the webpage) or transmit data, any such browser will participate in the audience measurement process without requiring modification. As a result, tagging enables collection of data from panelists and non-panelists alike. Therefore, data collected via a tagging approach such as that described above, is described herein as census data or census measurement data. Although examples disclosed herein are described in connection with browser-based interfaces used to present online media, disclosed techniques may also be used in connection with non-browser based applications that render media such as service-specific applications (e.g., client applications to stream media).

It is useful, however, to link demographics and/or other user information to the census data. For example, companies and/or individuals want to understand the reach and effectiveness of the media (e.g., content and/or advertisements) that they produce. For example, media that is associated with larger numbers of exposures and/or larger numbers of occurrences of an association may be considered more effective at influencing user behavior. Because census-based data includes users who are not panelists, panelist identifiers are not collected and/or identified from such users. Some census based systems collect impression data at the server level. Collecting information at the server level enables an accurate measure of information served by the monitored servers, but does not enable distinguishing media impressions from panelists and non-panelists or exposure to cached media (e.g., content served once and accessed one or more subsequent times from local memory). While servers may log an Internet Protocol (IP) address of a device that requested the information, IP addresses are prone to change (e.g., are dynamically assigned) and/or requests may come through proxy servers that mask the identity of the originally requesting device. Thus, server logs do not typically uniquely identify the requesting device and/or the user making the request.

To address this issue, audience measurement entities (sometimes referred to herein as "ratings entities") traditionally determine online media reach and frequency based on registered panel members. That is, an audience measurement entity enrolls people that consent to being monitored into a panel. In such panelist-based systems, demographic information is obtained from a user when, for example, the user joins and/or registers for the panel. The demographic information (e.g., race, age or age range, gender, income, home location, education level, etc.) may be obtained from the user, for example, via a telephone interview, an in-person interview, by having the user complete a survey (e.g., an online survey), etc. In some examples, demographic information may be collected for a home. For example, demographic information for a panel home may indicate age ranges of members in a panel home without identifying the umber of members in each of the age ranges. Thus, the granularity of the demographic information may depend on whether the demographic information is for a panelist or multiple individuals in a panel home. As used herein, the term "panelist" is generic to both a panelist and a panel home.

Companies such as The Nielsen Company (US), LLC utilize on-device meters to monitor usage of cellphones, tablets (e.g., iPads™) and/or other computing devices (e.g., PDAs, laptop computers, etc.). An on-device meter (ODM) is typically implemented by software that collects data of interest concerning usage of the monitored device. For example, the ODM may collect data indicating media access activities (e.g., website names, dates/times of access, clickstream data and/or other media identifying information webpage content, advertisements, etc.)) to which the panelist is exposed. This data is uploaded, periodically or aperiodically, to a data collection facility such as the audience measurement entity server. The data collected by a meter is referred to herein as ODM data or panelist data. ODM data is advantageous in that it can be linked to demographic information because the panelist has provided their demographics as part of the registration and the activity data collected by the ODM can, thus, be associated with that demographic information via, for example, a panelist identifier included in the ODM data transmitted to the audience measurement entity.

Typically, an entity such as The Nielsen Company (US), LLC that monitors and/or reports the usage of online media (e.g., content, advertisements or other types of media) operates as a neutral third party. That is, the audience measurement entity does not provide content and/or advertisements to end users. This un-involvement with the media ensures the neutral status of the audience measurement entity and, thus, enhances the trusted nature of the data it collects. Further, to ensure that panel members remain unbiased in their media access, it is important to the audience measurement entity that the panel members are not identified by other entities such as a content provider and/or advertising entity. That is, to ensure that the reports generated by the audience measurement entity are not skewed by content providers and/or advertising entities that may bias panelists, it is advantageous to collect monitoring information in a manner that protects the anonymity of the panelist and does not include identifiers (e.g., a panelist telephone number, a panelist social security number, a panelist name, etc.) that may be used to identify specific panelists.

Example methods, systems and apparatus disclosed herein may be used to collect monitoring information at a census level, and then correlate the census measurement data with panel samples. Examples disclosed herein facilitate collecting monitoring information at a census level by tracking the monitoring information included in beacons that are transmitted to the audience measurement entity server in response to media requests.

Example methods, systems and apparatus disclosed herein cause the beacon transmitted to the audience measurement entity server to include a location identifier. The location identifier may then be used to associate the corresponding monitoring information (e.g., media impression) with a panelist. Examples disclosed herein accomplish this by including device location information in the beacon that is associated with the geographic location at which the media was requested by the user device.

Examples disclosed herein facilitate comparing the device location included in the monitoring information to reference locations associated with the panelists. Reference locations correspond to geographic locations for a panelist home. For example, the reference locations may be global positioning system (GPS) coordinates. In some examples, a reference location may be obtained when a user joins and/or registers for a panel. For example, the reference location may be obtained by a technician who visits the home of the panelist to install metering equipment at the panelist home. For example, the technician may use a positioning system (e.g., a GPS wide area augmentation system (WAAS) enabled receiver) to obtain, for example, GPS coordinates for the panelist home. In some examples, the metering equipment may include a positioning system and/or include a wired and/or wireless network interface to receive location data from a nearby positioning system and/or transmit location data to user devices within the panelist home. In some such examples, the metering equipment may periodically and/or aperiodically transmit location data to the audience measurement entity server. In addition, when the metering equipment includes a positioning system the audience measurement entity may identify when the metering equipment is moved to a new location (e.g., outside the panelist home) based on a change in the location data received from the metering equipment.

When comparing the device location to reference locations, examples disclosed herein determine the distance between the device location and a reference location stored at the audience measurement entity. If the distance between the locations is less than a threshold, the user is considered to be requesting media from within the panelist home, and, based on this conclusion, examples disclosed herein proceed to associate the census data with a panelist identifier. The panelist identifier may then be used to associate demographic information to the monitoring information. For example, the age of a panelist may be used to determine an age range of viewers likely to watch a television show. In the illustrated examples, when the beacon is sent to the audience measurement entity server in response to rendering tagged media, the beacon includes the location identifier (e.g., the device location), and the impression entry logged at the audience measurement entity server includes the location identifier.

FIG. 1 is an illustration of an example environment 100 in which examples disclosed herein may be implemented to correlate census measurement data with panel data. The example environment 100 of FIG. 1 includes an audience measurement entity (AME) server 102, a media hosting server 104 and a client device 106. In some examples, the AME server 102 is implemented using multiple devices and/or the media hosting server 104 is implemented using multiple devices. For example, the AME server 102 and/or the media hosting server 104 may include disk arrays or multiple workstations (e.g., desktop computers, workstation servers, laptops, etc.) in communication with one another. In the illustrated example, the AME server 102 is in selective communication with the media hosting server 104 and/or the client device 106 via one or more wired and/or wireless networks represented by network 108. Example network 108 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, an audience measurement entity operates and/or hosts the example AME server 102. The AME of the illustrated example is an entity that monitors and/or reports access to tagged media. The AME server 102 of the illustrated example is a server and/or database that collects and/or receives monitoring information related to tagged media (e.g., media having inserted or embedded executable instructions that causes the media view (e.g., impression) to be recorded by for example, the AME server 102). The AME of the illustrated example is a neutral entity that is not involved with the distributing of media.

In the illustrated example of FIG. 1, a media provider operates and/or hosts the media hosting server 104 that responds to requests for media that may include tags. For example, the media provider may engage the AME to collect and/or monitor information related to media associated with the media provider. Such a media provider may wish to use tagged media in a media campaign to determine the effectiveness of the media campaign. In some examples, the information returned in response to the request for media includes an instruction (e.g., tag) to inform the AME server 102 of the accessing of tagged media. In some examples, the information returned in response to the request for media includes a reference to a tag and/or executable monitoring instructions. For example, the tag and/or executable monitoring instructions may be hosted at the AME server 102, which enables the AME to directly control the content of the tag and/or executable monitoring instructions. In some examples, the tag and/or executable monitoring instructions are hosted at the media hosting server 104. By including a reference to a tag and/or executable monitoring instructions in the media, the content of the tag (e.g., executable monitoring instructions may be changed at any time without modifying the media. For example, the tag and/or executable monitoring instructions may be updated to improve efficiency of collecting information for tagged media by updating the executable instructions hosted at the AME server 102 and/or the media hosting server 104. As shown above, the tag may reside wholly in the media or may be distributed between the media and the AME server and/or the hosting server. Tagged media may, thus, include an executable monitoring instruction that serves as a tag or a reference to monitoring instructions stored at an external location such as a server. In the later case, the reference may be considered a first tag or portion of a tag and the external instruction may be considered a second tag or a portion of a tag. In some examples, the media hosting server 104 is operated and/or hosted by a third party. In addition, for simplicity, only one media hosting server 104 is shown in FIG. 1, although multiple media hosting servers are likely to be present.

In the illustrated example of FIG. 1, the client device 106 is a smartphone (e.g., an Apple® iPhone®, a Motorola™ Moto X™, a Nexus 5, an Android™ platform device, etc.). However, any other type of device may additionally or alternatively be used such as, for example, a tablet (e.g., an Apple® iPad™, a Motorola™ Xoom™, etc.), a laptop computer, a desktop computer, a camera, an Internet compatible television, a smart TV, etc. The client device 106 of FIG. 1 (sometimes referred to herein as a "user device" or "mobile device") is used to access (e.g., request, receive, render and/or present) online media that is tagged and returned by the media hosting server 104. For example, the user may execute a web browser on the client device 106 to request streaming media (e.g., via an HTTP request) from the media hosting server 104. In response to accessing the tagged media, media impression information, including device location information, is sent to the AME server 102.

As discussed above, a media provider may engage the ASE to collect and/or monitor information related to media associated with the media provider. For example, the media provider may want to compare the performances of three distinct pieces of media (e.g., media A, B, and C) to one another and/or to other media and/or to an expected or desired performance (e.g., reach and/or frequency) of the three pieces of media (e.g., media A, B and C). In the illustrated example of FIG. 1, the AME server 102 includes an example tag handler 110 to facilitate tagging media A, B and C to enable the AME server 102 to track when media is requested by, for example, the client device 106. In the illustrated example, the tag handler 110 of FIG. 1 provides tags and/or references to tags to the media hosting server 104 for inserting into media. For example, the tag handler 110 may provide the media hosting server 104 an example tag A to include (e.g., insert, embed, etc.) in the media A, a tag B to include in the media B, and a tag C to include in the media C. As discussed above, a tag may be a reference to monitoring instructions such that the reference, but not the instructions are embedded in the media. Alternatively, the tag may be the executable monitoring instructions and may be located directly in the media and/or at an external location accessible to the media.

In the illustrated example, the tag handler 110 generates a tag that is later included in media hosted by the media hosting server 104. Based on the preferences of the media provider and or the AME, the tag handler 110 generates a tag that achieves the goals of the media provider and/or the AME. The tag handler 110 generates tags that enable the AME server 102 to collect and/or receive monitoring information related to the tagged media (e.g., media A, B and C). In some examples, the generated tags are then stored in a data structure such as a lookup table, and used by the tag handler 110 to facilitate tagging media.

In some examples, the tag handler 110 generates the tags A, B, C and instructs the media hosting server 104 to include the tags A, B, C into the corresponding media A, B, C. In other examples, the tag handler 110 generates the tags A, B C and embeds the tags A, B, C into the corresponding media A, B, C and then provides the tagged media (e.g., the media A including tag A, the media. B including tag B, the media C including tag C) to the media hosting server 104. In some examples, the tag handler 110 generates the tags A, B, C and instructs the media hosting server 104 to include references to the tags A, B, C in the corresponding media A, B, C. For example, the media hosting server 104 may embed a tag A reference into the media A, a tag B reference into the media B, and a tag C reference into the media C. The tag references (A, B, C) may then be used to request the corresponding tag (A, B, C). For example, when the media A including the tag A reference is accessed at the client device 106, the client device 106 may also send a request for the tag A using the tag A reference. In some such examples, the tag handler 110 generates the tags (e.g., tags A, B, C) and the tag references (e.g., references to the tags A, B, C) and provides the tag references (e.g., references to the tags A, B, C) to the media hosting server 104 to insert into the corresponding media (e.g., media A, B, C) while the tag handler 110 stores the tags (e.g., tags A, B, C). Thus, when the client device 106 accesses the media including the tag reference, the client device 106 uses the tag reference to request the corresponding tag from the tag handler 110. In other examples, the tag handler 110 provides the tags A, B, C and the tag references (e.g., references to the tags A, B, C) to the media hosting server 104. In some examples, the tag handler 110 generates the tags A, B, C and provides to the media hosting server 104 the tags A, B C to include in the corresponding media A, B, C and instructions to generate references to the tags A, B, C. For example, the media hosting server 104 may host the media to be tracked (e.g., media A, B, C), the tags A, B, C, generate references to the tags A, B, C, and embed the references A, B, C into the corresponding media A, B, C. In some examples, when the client device 106 accesses the media including the tag reference, the client device 106 requests the corresponding tag from the media hosting server 104. Thus, for example, when executable instructions of a tag need to be updated (e.g., replaced with executable instructions that improve efficiency in collecting media monitoring information), neither the media nor the reference to the tag included in the media needs to be modified. Rather, the tag handler 110 enables modifying only the tag on the server side (e.g., the instructions referenced by the tag included in the media).

Figure 2:
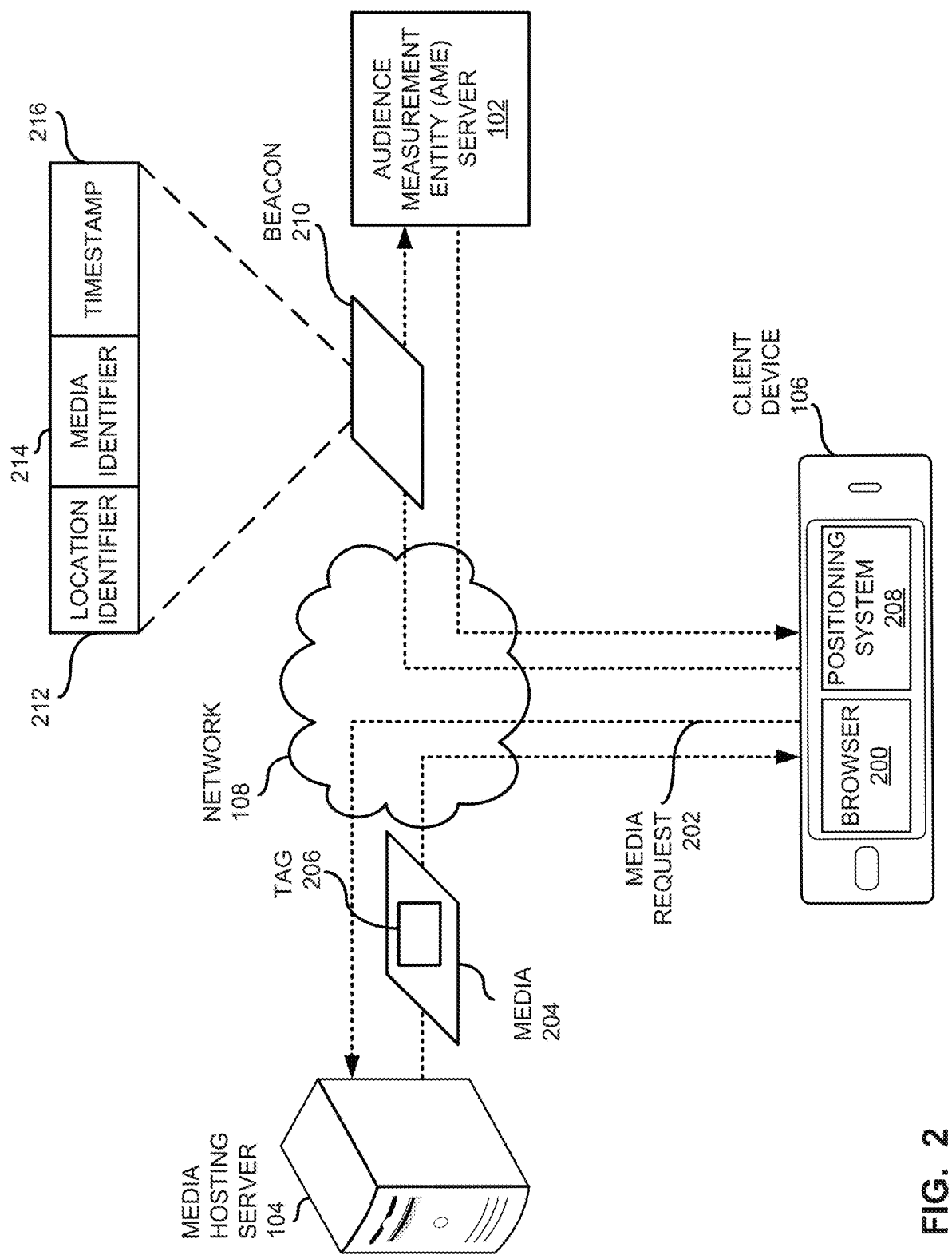
FIG. 2 is a diagram of an example message path illustrating metering of tagged media.

FIG. 2 is a diagram of an example message path illustrating metering of tagged media. In the illustrated example of FIG. 2, the example client device 106 transmits a media request 202 for media to the example media hosting server 104 via a browser 200. In some examples, the media request 202 includes a user agent identifying characteristics of the browser 200 and/or the client device 106 such as a browser identifier, a device identifier, etc. The media hosting server 104 of the illustrated example includes media (e.g., a website, an image, a video, etc.) that, when requested by the browser 200, causes the media hosting server 104 to respond with media 204 including a tag 206. The tagged media 204 of the illustrated example includes executable instructions such as an apples (e.g., the tag 206) that, when executed by the browser 200, cause the browser 200 to send a communication (or beacon) including monitoring information (e.g., census measurement data) to the AME server 102. The tag 206 may be included in the requested media in accordance with the teachings of Blumenau, U.S. Pat. No. 6,108,637. Accordingly, the browser 200 transmits an example beacon 210 to the AME server 102. In some such examples, the beacon 210 is a "dummy request" in that it is not actually intended to return data. Instead, the beacon 210 is used to carry monitoring information to the AME server 102. In some examples, the beacon 210 is implemented as an HTTP POST message, an HTTP GET message, or similar message used in present and/or future HTTP protocols. In the illustrated example, the beacon 210 includes a location identifier 212 (e.g., data specifying a device location corresponding to the geographic location at which the media was accessed), a media identifier 214 (e.g., data specifying the media 204) and a timestamp 216 corresponding to the date and/or time for when the media was accessed (e.g., data specifying when the media 204 was received).

In the illustrated example of FIG. 2, the client device 106 includes the positioning system 208 to enable identification of the geographic location of the client device 106, The positioning system 208 of the illustrated example is implemented by a global positioning system (GPS). In some examples, the positioning system 208 uses the Wide Area Augmentation System (WAAS) and may accurately determine the location of the client device 106 between three and five feet. In some examples, the positioning system 208 determines the geographic location (e.g., GPS coordinates) based on signals received from satellites representative of the positions of the satellites in relation to the location of the client device 106. However, in some other examples, the positioning system 208 determines location based on positions of cellular radio towers in relation to the location of the client device 106 (e.g., using a triangulation method). However, any other past, present and/or future method for determining the device location of the client device 106 (e.g., cellular tower triangulation, Wi-Fi data, GPS data sent from another device using a wired and/or wireless network interface such as Bluetooth®, etc.) may be used by the client device 106 to provide location information of the client device 106 when accessing the requested media.

The AME server 102 of the illustrated example records that a request (e.g., the beacon 210) was received and also records any data contained in the beacon 210 (e.g., the location identifier 12, the media identifier 214, the timestamp 216, a cookie, etc.). The AME server 102, in some examples, responds to the request with an acknowledgement message. In some examples, the acknowledgement message requests and/or sets a cookie in the client device 106 to, for example, enable identification of subsequent beacons from the same client device.

Figure 3:
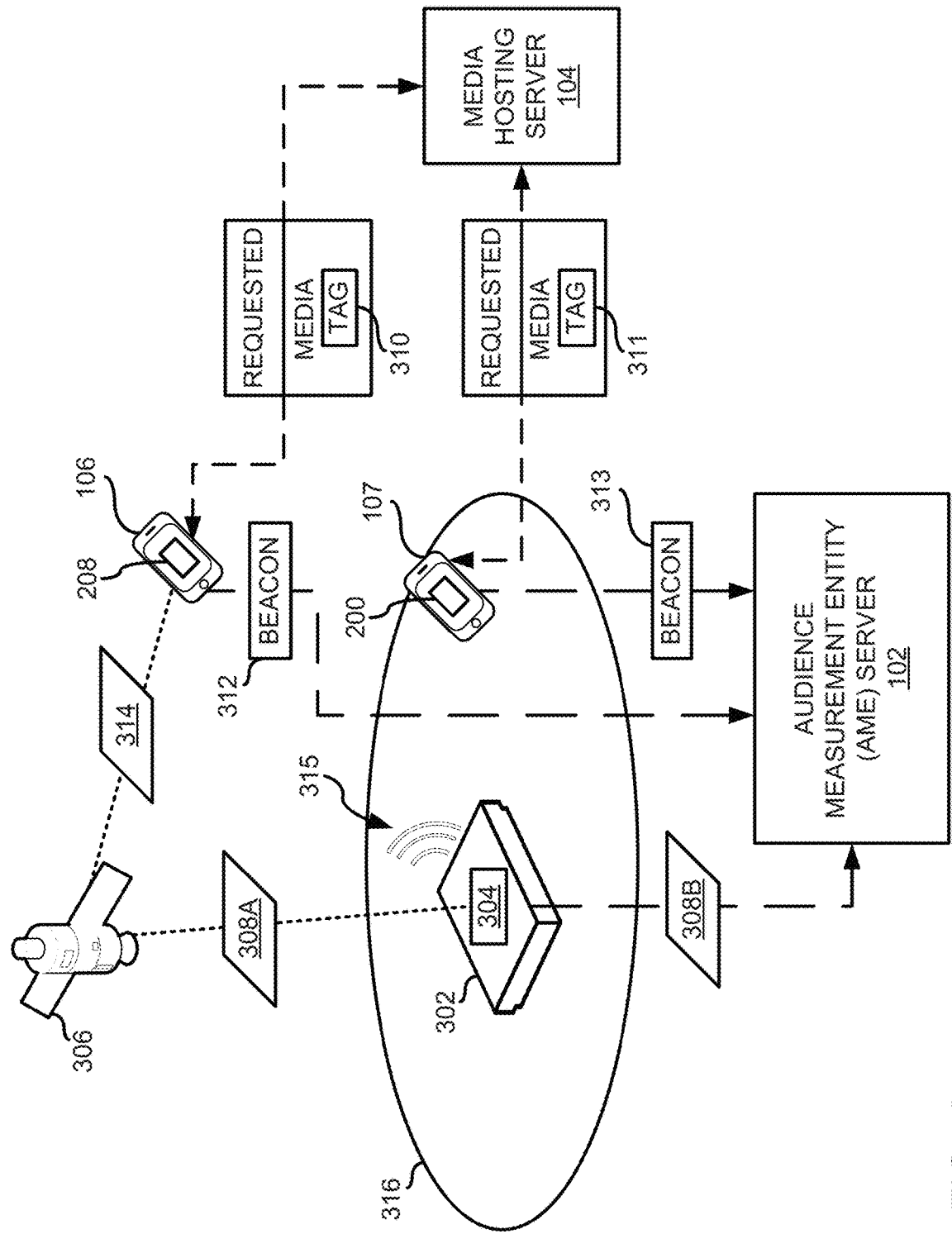
FIG. 3 is a diagram of an example message path illustrating correlating census measurement data with panel data.

FIG. 3 is a diagram of another example message path illustrating metering of tagged media. In the illustrated example of FIG. 3, example metering equipment 302 is installed in a panelist home. The example metering equipment 302 of the illustrated example includes a meter positioning system 304 that is implemented by a global positioning system such as a GPS WAAS enabled receiver. In the illustrated example, the meter positioning system 304 determines the geographic location 308A of the metering equipment 302 based on signals (e.g., clock signals) received from three or more GPS satellites 306 representative of the positions of the satellites in relation to the location of the meter positioning system 304. The example metering equipment 302 may periodically and/or aperiodically transmit geographic location data 308A, 308B obtained and/or derived by the meter positioning system 304 from signals received from the UPS satellites 306 to the AME server 102. In the example of FIG. 3, the geographic location data 308A, 308B are the same geographic location data at two different points in time. Geographic location data 308A is the geographic location data when provided by the UPS satellites 306 to the meter positioning system 304. Geographic location data 308B is the geographic location data when provided by the metering equipment 302 to the AME server 102. The example AME server 102 of the illustrated example of FIG. 1 stores the geographic location data 308B as reference location data 308B for the corresponding panelist in a panelists log.

In the illustrated example of FIG. 3, the media hosting server 104 responds to media requests by client devices 106, 107 with tagged media. In the illustrated example, the example media hosting server 104 sends to the client device 106 media including a tag 310, and sends to the client device 107 media including a tag 311. As described above, the tags 310, 311 are executable instructions (e.g., an applet) that cause media monitoring information to be sent to the ASE 102. In some examples, the tags are links to such executable instructions.

More specifically, in response to presenting the requested media including the tag 310, the client device 106 executes the executable instructions (e.g., the tag 310), which causes the client device 106 to send a beacon 312 to the AME server 102. In addition, executing the tag 310 causes the client device 106 to identify a geographic location of the client device 106. In the illustrated example, the positioning system 208 of the client device 106 enables identification of the device location of the client device 106. In the illustrated example, the client device 106 obtains device location data 314 (e.g., GPS coordinates) from the positioning system 208 based on signals received from the GPS satellites 306. The example client device 106 of FIG. 3 then transmits the device location data 314 as a location identifier to the AME server 102 in the beacon 312.

In a similar manner, in response to presenting the requested media including the tag 311, the client device 107 executes the tag 311, which causes the client device 107 to send a beacon 313 to the AME server 102. In addition, executing the executable instructions 311 causes the client device 107 to identify a geographic location of the client device 107. In the illustrated example of FIG. 3, the client device 107 does not include a positioning system, but may receive location information from a proximate device. In the illustrated example, the metering equipment 302 broadcasts geographic location information 315 that may be received by nearby devices. For example, the metering equipment 302 of the illustrated example broadcasts the geographic location information 315 via a Bluetooth® interface. In some such examples, if the client device 107 also includes a Bluetooth interface, the client device 107 receives the geographic location information 315 from the metering equipment 302 and transmits the geographic location information 315 to the AME 102 as a location identifier in the beacon 313.

In some examples, a client device transmitting a beacon to the AME server 102 may not include a positioning system and/or a geographic location information receiving interface (e.g., a Bluetooth interface) and/or the application requesting the media (e.g., the browser 200) may not have access to the positioning system of the client device. In some such examples, the client device transmits the beacon to the AME server 102 without a location identifier. When processing a beacon without a location identifier, the AME server 102 marks the monitoring information included in the beacon as census data.

In the illustrated example of FIG. 3, to determine whether to correlate monitoring information included in a beacon to a registered panelist, the AME server 102 compares the device location included in the location identifier to reference locations associated with registered panelists. For example, if the device location is within a threshold distance of a reference location, the panelist identifier corresponding to the reference location may be associated with the monitoring information corresponding to the location identifier received with the beacon. Otherwise, the monitoring information is marked as census data.

In some examples, the AME server 102 compares device locations to reference areas associated with the registered panelists. The associated reference area of a panelist corresponds to a geographic area around a reference location. In some examples, the reference area varies based on known information about the panelist home (or other location (e.g., job, favorite hangouts, etc.)) and the corresponding reference location. In some examples, reference locations (e.g., job, favorite hangouts, etc.) are determined by collecting geographical locations from a portable meter and/or a computing device cellphone, tablet, PDA, laptop computer, etc.) including an on-device meter (ODM) (e.g., an ODM utilized by The Nielsen Company (US), LLC) carried by a registered panelist. In some examples, the size of a reference area depends on whether the panelist home is an apartment, a house, etc., and the site of the geographic area surrounding the reference location depends on the location of the metering equipment in the panelist home. For example, if the metering equipment 302 is known to be located against an exterior wall of the panelist home, reference area 316 may be positioned around the reference location data 308B so that the reference location data 308B is near an edge of the reference area 316 rather than in the center of the reference area 316. Further, although the reference area 316 is represented as an ellipse in the illustrated example, the reference area 316 may be another shape such as a circle, a hexagon, or any other suitable shape.

In the illustrated example, the example AME server 102 uses reference locations associated with registered panelists to compare to the device locations included in beacons received from client devices to determine whether to associate the corresponding monitoring information with a registered panelist. For example, the AME server 102 of the illustrated example determines whether the device locations data 314, 315 included in the corresponding beacons 312, 313 are within the reference area 316. If a device location is within the reference area associated with a registered panelist, the AME server 102 associates the monitoring information from the corresponding beacon with the corresponding registered panelist. For example, monitoring information included in the beacon 313 may be correlated with a panelist associated with the reference location data 308B because the AME server 102 determines that the device location 315 is within the reference area 316 corresponding to that panelist. In contrast, if the device location is not within the reference area associated with a registered panelist, the AME server 102 marks the corresponding monitoring information as census data. For example, the AME server 102 of the illustrated example marks the monitoring information included in the beacon 312 as census data because the device location data 314 is not within the reference area 316.

Figure 3A:
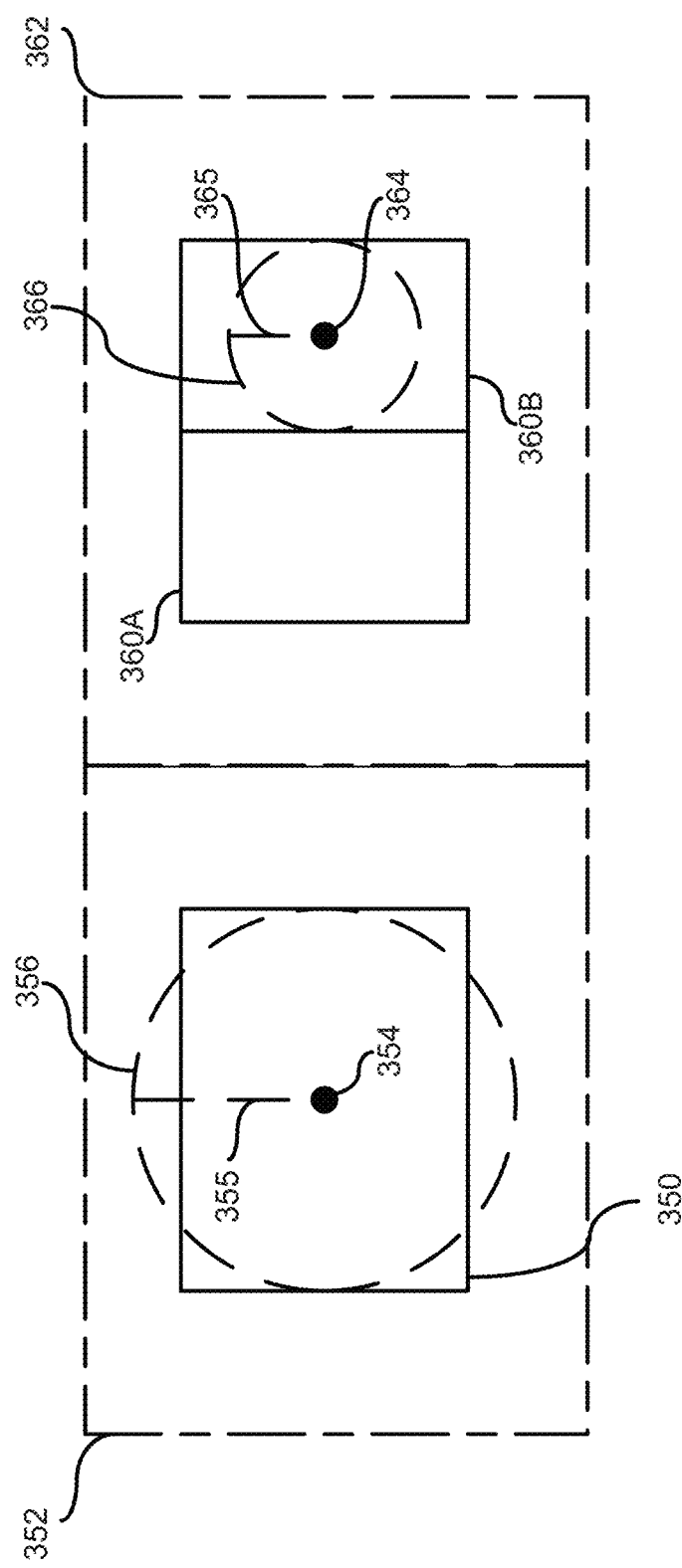
FIG. 3A is a diagram of an example environment constructed in accordance with the teachings of this disclosure to correlate census measurement data with panel data.

FIG. 3A is an illustration of an example environment 340 in which examples disclosed herein may be implemented to correlate census measurement data with panel data. The example environment 340 of the illustrated example includes an example household 350 (e.g., a house) located within an example yard 352 and an example household 360A, 360B (e.g., duplex apartments) located within an example yard 362. In the illustrated example of FIG. 3A, members of the household 350 and members of the household 360B are panelists who have consented to being monitored (e.g., included in a panel), and have provided demographics information, either about the household (e.g., the household 350 is a panelist home) or about individual members of the household (e.g., the household 350 includes panelists 1, 2, and 3). The member(s) of the household 360A of the illustrated example have not consented to being panelists, and thus, demographics information for those members is not known.

In the illustrated example of FIG. 3A, the ample household 350 is associated with a reference location 354. The reference location 354 may be collected via a meter including a positioning system such as a UPS enabled device (e.g., the example meter 302 of FIG. 3), from a device including a positioning system that is proximate to a meter in the household 350, by a technician using a positioning system who visited the household 350, etc. In the illustrated example of FIG. 3A, the example household 350 is also associated with a reference area 356. The example reference area 356 of FIG. 3A is an approximation of the area of the household 350 in which a member of the household 350 may request and/or access media e.g., via the example client device 106 of FIGS. 1-3). In the illustrated example, the reference area 356 is determined using an example radius 355.

In a similar manner, the example household 360B of FIG. 3A is associated with a reference location 364, which may be collected via, for example, a meter including a positioning system (e.g., a. GPS enabled device from a device including a positioning system that is proximate to a meter in the household 360B, by a technician using a positioning system who visited the household 360B, etc. In the illustrated example of FIG. 3A, the example household 360B is associated with a reference area 366. The example reference area 366 is an approximation of the area of the household 360B in which a member of the household 360B may request and/or access media (e.g., via the example client device 106). In the illustrated example, the reference area 356 is determined using an example radius 365.

As described above, the area of a reference area may vary based on known information about the associated household. For example, the AME server 102 may vary the radius 355, 365 used to determine the reference areas 356, 366 based on the household type. For example, as the household 350 is known to be a house, the example AME server 102 may assume that the household 350 is located within the yard 352, and, based on this conclusion, the AME server 102 may use a radius 355 that extends beyond the perimeter of the physical structure of the household 350 (e.g., beyond the walls) without the reference area 356 overlapping with another household. Thus, when the AME server 102 receives a beacon including device location information positioned within the reference area 356, the AME server 102 associates the corresponding monitoring information with the demographic information associated with the household 350.

In contrast, the household 360B is known to be a duplex apartment, and the example AME server 102 can use this information to determine that the household 360B likely shares a wall with another household (e.g., the household 360A). For some purposes, the AME server 102 uses the radius 365, which is less than the radius 355 and does not extend beyond the walls of the household 360B, thereby reducing the probability of the reference area 366 overlapping with another household. As a result, device location information positioned within the reference area 366 can be correctly credited to the household 360B and not erroneously credited to a neighbor.

Although the reference areas 356, 366 of FIG. 3A are determined using a radius, many other methods of determining the reference area are possible. For example, two or more GPS coordinates may be used to calculate a reference area that is a rectangle, a hexagon, etc.

Figure 4:
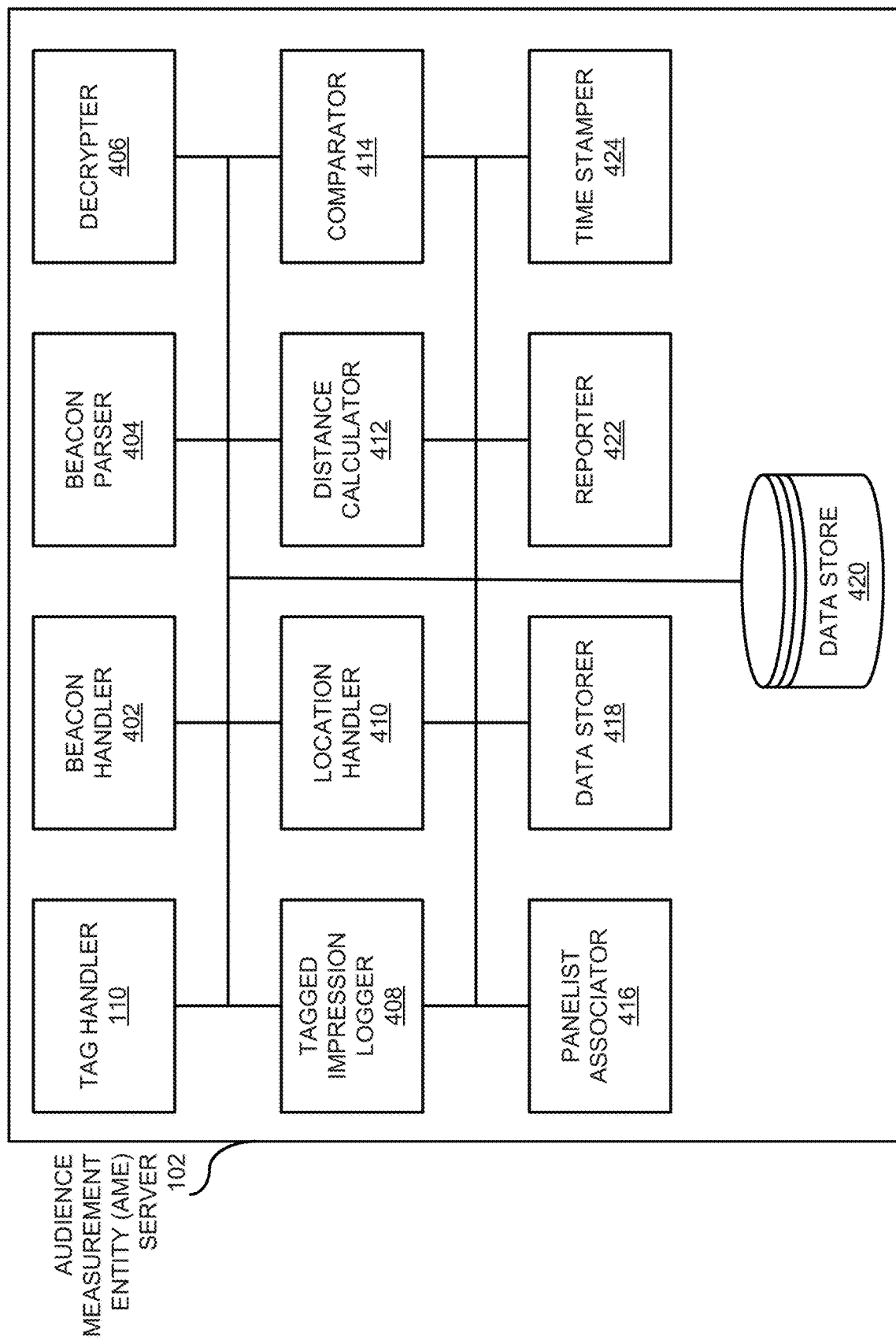
FIG. 4 is a block diagram of an example implementation of the audience measurement entity server of FIG. 1 that may facilitate correlation of census measurement data with panel data.

FIG. 4 is a block diagram of an example implementation of the AME server 102 of FIGS. 1-3. The example AME server 102 of the illustrated example includes the example tag handler 110, an example beacon handler 402, an example beacon parser 404, an example decrypter 406, an example tagged impression logger 408, an example location handler 410, an example distance calculator 412, an example comparator 414, an example panelist associator 416, an example data storer 418, an example data store 420, an example reporter 422 and an example time stamper 424. As discussed above, the AME server 102 includes the example tag handler 110 to facilitate tagging media. For example, the tag handler 110 may instruct the media hosting server 104 to insert the tag 206 (which may be a reference to an external tag) into the media 204. For example, the tag handler 110 may provide the media hosting server 104 executable instructions (e.g., the tag 206, an applet, etc.) to embed into the media 204. In some examples, the tag handler 110 instructs the media hosting server 104 to insert a reference to the tag 206 into the media 204 and the tag is hosted outside the media. In some such examples, when the client device 106 accesses the media 204, the client device 106 also sends a request for the tag 206 using the reference. In the illustrated example, when the tag handler 110 instructs the media hosting server 104 to insert a reference to the tag 206, the tag 206 may be hosted at the media hosting server 104 and/or at the AME server 102.

In the illustrated example of FIG. 4, the AME server 102 includes the example beacon handler 402 to facilitate communication with client devices (e.g., the client device 106 of FIGS. 1-3). For example, the beacon handler 402 may receive dummy requests (e.g., beacons) from the client device 106 executing the executable instructions (e.g., the tag 206). In some examples, the beacon handler 402 receives the beacon 210 from the browser 200 of FIG. 2. In some examples, the beacon handler 402 sends an acknowledgement response to the browser 200 in response to receiving the beacon 210. In other examples, no response is provided.

In the illustrated example of FIG. 4, the AME server 102 includes the example beacon parser 404 to extract location information included in the beacon 210. For example, the beacon parser 404 may identify the location identifier 212 of FIG. 2. In some examples, the beacon parser 404 may identify a user agent identifying the browser 200 and/or the client device 106. For example, the user agent may include a network address, a media access control (MAC) address, a telephone number, etc. associated with the client device 106. In some examples, the beacon parser 404 may identify a media identifier identifying the media that was received in the media response 206 of FIG. 2 (e.g., the media identifier 214 (FIG. 2)). In some examples, the beacon parser 404 may identify and/or set a cookie enabling identification of subsequent beacons from the same client device. In some examples, the beacon parser 404 may be unable to identify a location identifier in the beacon 210. For example, when the beacon 210 is sent from a client device that does not include a positioning system and/or does not have access to a positioning system, the beacon 210 will not have the location identifier.

In the illustrated example of FIG. 4, the AME server 102 includes the example decrypter 406 to decrypt information in the beacon 210. For example, information included in the beacon 210 may be encrypted. For example, the executable tag 206 may cause the browser 200 to encrypt the device location information and/or the monitoring information prior to including the location identifier 212 in the beacon 210. In this manner, personal data such as precise location data that may identify where a user is accessing media is protected. In some such examples, the decrypter 406 may be used to decrypt the information included in the beacon 210 prior to the beacon parsing 404 parsing the beacon 210.

In the illustrated example of FIG. 4, the AME server 102 includes the example tagged impression logger 408 to credit (or log) impressions to media based on the monitoring information included in the beacon 210. For example, the tagged impression logger 408 may list the corresponding media (e.g., via one or more media identifiers) in a data structure. In some examples, the tagged impression logger 408 appends and/or prepends additional information crediting the identified media with an exposure. For example, the tagged impression logger 408 may identify a media source from which the media was received (e.g., a vendor identifier, a URL, etc.), a network address of the client device 106 and/or an identifier of the client device 106 (e.g., an international mobile equipment identity (IMEI) number, a cookie, a MAC address, etc.). In addition, the tagged impression logger 408 may append a timestamp from the example time stamper 424 indicating the date and/or time when the beacon 210 was received by the AME server 102. This timestamp may be in addition to a timestamp applied at the client device to identify the media access time.

In the illustrated example of FIG. 4, the AME server 102 includes the example location handler 410 to determine reference locations to which to compare to the device location extracted from the beacon 210. As described above, a reference location corresponds to a geographic location of a panelist home. In the illustrated example, the reference locations are stored in the data store 420 along with a panelist identifier and/or additional panelist information associated with a panelist. For example, the panelist information may include demographic information (e.g., gender, age group, race, income, level of education, etc.) collected from a user when the user joins or registers for the panel.

The location handler 410 of the illustrated example of FIG. 4 uses a data structure (e.g., a lookup table) stored in the example data store 420 to identify reference locations associated with the registered panelists. A registered panelist may be associated with one or more reference locations and/or reference areas (e.g., a house area, a work area, a vacation home area, etc.). In some examples, the location handler 410 filters reference locations based on the extracted device location. For example, the location handler 410 may parse the reference locations stored in the data store 420 and identify the reference locations that have the same (or nearly the same) longitude coordinates or latitude coordinates of the device location specified in the beacon.

In the illustrated example of FIG. 4, the AME server 102 includes the example distance calculator 412 to calculate the distance between a device location extracted from a beacon by the beacon parser 404 and one or more reference location(s) obtained from the location handler 410. For example, the distance calculator 412 may use any distance-calculating algorithm to determine the distance between the two locations.

In the illustrated example of FIG. 4, the AME server 102 includes the example comparator 414 to compare the distance calculated by the example distance calculator 412 to a threshold. The example comparator 414 of the example of FIG. 4 outputs a message indicating whether to associate the corresponding monitoring information with a panelist based on the comparison based on whether the threshold is satisfied (e.g., the calculated distance is within the threshold).

In some examples, the comparator 414 compares the extracted device location to a reference area based on a reference location. In some examples, the attributes of the reference area (e.g., size, geographic area, center, shape, etc.) are selected based on panelist information such that different reference areas have different attributes. For example, if a first reference location corresponds to an apartment unit and a second reference location corresponds to a ranch-style house, the example comparator 414 may determine a reference area surrounding the first reference location that is smaller than a reference area surrounding the second reference location to ensure the first reference area does not extend into a third party's living space. The example comparator 414 determines whether the device location is within the reference area (e.g., within a radius as discussed in connection with FIG. 3A) in order to decide whether to credit the media exposure to the corresponding panelist or label the exposure as census data.

In the illustrated example of FIG. 4, the AME server 102 includes the example panelist associator 416 to associate monitoring information extracted by the beacon parser 404 with a panelist. In the illustrated example, when the comparator 414 determines that the distance between a device location and a reference location is less than a threshold distance and/or that the device location is within a reference area including a corresponding reference location, the example panelist associator 416 associates the monitoring information (e.g., the media exposure) included in the beacon 210 with a registered panelist. For example, the panelist associator 416 may use a lookup table to determine a panelist identifier corresponding to the reference location. However, other methods to determine the registered panelist may additionally or alternatively be used. In some examples, the panelist associator 416 appends additional panelist information to the corresponding media impression logged by the tagged impression logger 412. For instance, in the example of FIG. 4, the panelist associator 416 appends demographic information to the tagged impression logger.

In some examples, the panelist associator 416 may be unable to associate monitoring data with a registered panelist. For example, the comparator 414 may output a message indicating that the corresponding device location was not within the threshold distance of the reference locations in the panel. In some other examples, the beacon parser 404 may not provide a device location. In some such examples, the panelist associator 416 attributes this to a non-panelist media impression and associates the monitoring information included in the beacon 210 as census data. In the illustrated example, the panelist associator 416 appends a label indicating that the corresponding media impression logged by the tagged impression logger 408 is census data.

In the illustrated example of FIG. 4, the example data storer 418 stores monitoring information received from the beacon parser 404, the media impression logged by the tagged impression logger 408 and/or panelist identifying information received from the panelist associator 416.

The example data store 420 of FIG. 4 may be implemented by any storage device and/or storage disc for storing data such as, for example, flash memory, magnetic media, optical media, etc. Furthermore, the data stored in the data store 420 may be in any data format such as, for example, binary data, comma delimited data, tab delimited data, structured query language (SQL) structures, etc. While in the illustrated example the data store 420 is illustrated as a single database, the data store 420 may be implemented by any number and/or type(s) of databases.

In the illustrated example of FIG. 4, the reporter 422 generates reports based on the collected monitoring information. In some examples, the reports are presented to the media provider(s) and/or other entities. The reports may identify different aspects of media usage such as, for example, homer many impressions the media received and demographics associated with those impressions.

The example time stamper 424 of FIG. 4 includes a clock and a calendar. The example time stamper 424 associates a time period (e.g., 1:00 a.m. Central Standard Time (CST) to 1:01 a.m. (CST) and a date (e.g., Jan. 1, 2013) with each generated tagged impression entry from the tagged impression logger 408 by, for example, appending the period of time and the date information to an end of the data in the impression entry, including the media impressions identified as census data by the panelist associator 416.

While an example manner of implementing the AME server 102 of FIGS. 1-3 is illustrated in FIG. 4, one or more of the elements, processes and/or devices illustrated in FIG. 4 may be combined, divided, re-arranged, omitted, eliminated and/or implemented in any other way. Further, the example media hosting server 104, the example client device 106, the example client device 107, the example tag handler 110, the example beacon handler 402, the example beacon parser 404, the example tagged impression logger 408, the example location handler 410, the example distance calculator 412, the example comparator 414, the example panelist associator 416, the example data storer 418, the example data store 420, the example reporter 422, the example time stamper 424 and/or, more generally, the example AME server 102 of FIGS. 1-3 may be implemented by hardware, software, firmware and/or any combination of hardware, software and/or firmware. Thus, for example, any of the example media hosting server 104, the example client device 106, the example client device 107, the example tag handler 110, the example beacon handler 402, the example beacon parser 404, the example tagged impression logger 408, the example location handler 410, the example distance calculator 412, the example comparator 414, the example panelist associator 416, the example data storer 418, the example data store 420, the example reporter 422, the example time stamper 424 and/or, more generally, the example AME server 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media hosting server 104, the example client device 106, the example client device 107, the example tag handler 110, the example beacon handler 402, the example beacon parser 404, the example tagged impression logger 408, the example location handler 410, the example distance calculator 412, the example comparator 414, the example panelist associator 416, the example data scorer 418, the example data store 420, the example reporter 422 and/or the example time stamper 424 is/are hereby expressly defined to include a tangible computer readable storage device or storage disk such as a memory, a digital versatile disk (DVD), a compact disk (CD), a Blu-ray disk, etc. storing the software and/or firmware. Further still, the example AME server 102 of FIGS. 1-3 may include one or more elements, processes and/or devices in addition to, or instead of, those illustrated in FIG. 4, and/or may include more than one of any or all of the illustrated elements, processes and devices.

FIG. 5 is an example data table 500 storing data representing tagged media impressions that may be collected by the example AME server 102 of FIGS. 1-4. In the illustrated example of FIG. 5, the data table 500 identifies a requested website 502, a device location 504, a timestamp from the client device of the request 506 and a possible panel data flag 508 indicating whether an impression is panel data or is census data. In the illustrated example, the AME server 102 extracts the device location from the location identifier 212 of the beacon 210 when the location identifier is present. For example, the impression entry 510 indicates that a user requested the website (Host1.com) at 9:15:00 AM on Nov. 10, 2013, from a device location with GPS coordinates (41.87989, −87.637158). Further, since the impression entry 510 includes a device location, the impression entry 510 is flagged as possible panel data, depending on whether the device location satisfies a threshold (e.g., the calculated distance between the device location and a reference location is within the threshold) and/or the device location is positioned within a reference area. In contrast, in the impression entry 512, the user who accessed the website (Host2.com) at 9:45:05 AM on Nov. 10, 2013, did so with a client device that did not provide device location information for the client device when it provided the beacon. As a result, the impression entry 512 is flagged as census data (e.g., not possible panel data). In some examples, the data table 500 may include additional information such as device identifiers (e.g., a telephone number of the client device, a media access control (MAC) address of the client device, a serial number of the client device, etc.), a vendor identifier (e.g., the person/entity to which the website 502 is registered), a browser identifier, a control action identifier (e.g., a control action such as play, stop, pause, etc. that triggers a media request), a cookie, etc.

FIG. 6 is an example data table 600 that may be stored by the example AME server 102 of FIGS. 1-4 to facilitate associating monitoring information with panelist information. In the illustrated example of FIG. 6, the data table 600 associates a panelist identifier 602 with a reference type 603 (e.g., a house, an apartment, an office building, etc.) and a reference location 604. For example, in row 616, the panelist identifier (10001) is associated with the reference location provided by the GPS coordinates (41.87989, −87.637158). Further, in row 616, the reference location 604 corresponds to a duplex apartment. As discussed above, the reference location 604 may be obtained by, for example, a technician visiting a panelist home, metering equipment included in the panelist home and/or metering hardware (e.g., a portable meter) or software e.g., an on-device meter included in a monitored device) that is in possession of the panelist. In addition, the example data table 600 includes a reference area 605 that corresponds to the reference type 603. For example, the radius may vary based on whether the reference type is a house, an apartment, a gym, etc. Further, the example data table 600 includes demographic information associated with the registered panelists. For example, the data table 600 of FIG. 6 includes a gender identifier 606, an age range 608, a city of residence 610 and a relationship status 612 for the panelists included in the data table 600. Thus, for example, in row 620, a registered panelist with the panelist identifier (10003) is associated with the reference location provided by GPS coordinates (39.739166, −104.984720), and is also a female between the ages of 18 and 34, who lives in Denver, Colorado, and is single. In some examples, a panelist is associated with two or more reference locations. In some such examples, the different reference locations may correspond to known locations where the panelists accesses media. For example, in row 620, the reference location 604 is associated with an apartment the panelist may live at; in row 622, the reference location 604 is associated with a gym the panelist frequents; and, in row 624, the reference location 604 is associated with a vacation home that the panelists owns. In this manner, correlating census data with panel data is not limited to a single location. Rather, census data collected at different locations may be correlated with the same panel data. In some examples, the data table 600 may include additional information associated with the reference location such as the type of residence (e.g., an apartment unit, a house, etc.), whether the metering equipment is located near an external wall, etc. In some examples, the data table 600 may include more demographic information associated with the registered panelists such as, for example, race, income, level of education completed, occupation, etc. By using geographic locations for the tagged media system and the panelists log, user privacy of the panelist is protected. For example, personally-identifying information is not revealed while transmitting information (e.g., the monitoring information) to the AME server 102 and/or the client device 106. Further, in some examples, the location identifiers, the monitoring information and/or the beacon 210 may be encrypted for increased privacy.

FIG. 7 illustrates an example data table 700 representing correlated media impressions collected by the AME server 102 of FIGS. 1-4. In the illustrated example of FIG. 7, the data table 700 is an aggregated table including the tagged media impressions from the example data table 500 and panelist information from the example data table 600. For example, row 720 of FIG. 7 corresponds to row 510 of FIG. 5. In the illustrated example, the example data table 700 identifies whether the impression was credited as census or panelist data 702 (e.g., whether the monitoring information corresponds to activity of a panelist or a non-panelist), a panelist identifier 704 (if applicable), a requested website 706, a device location 708, a timestamp of the media request 710. The example data table 700 also identifies demographic information retrieved from the example data table 600 (e.g., city of residence 712).

The panelist identifier column 704 of the illustrated example of FIG. 7 corresponds to an identifier for a registered panelist. For example, when the AME server 102 determines that monitoring information extracted from a beacon may be correlated to a registered panelist, the AME server 102 may use the data table 600 of FIG. 6 and append the corresponding panelist identifier to the corresponding impression entry in the data table 700. In some examples, when a panelist is identified, the AME server 102 may append additional demographic information from the data table 600 to the impression entry. For example, the AME server 102 may append the gender, age range, relationship status, etc. of the panelist to the corresponding impression entry in the data table 700.

In the illustrated example of FIG. 7, identifying whether the exposure was monitored via census data or panelist data 702 may be beneficial for analysis purposes. For some purposes, census data may include information pertaining to panelists and non-panelists.

The panelist identifier 704 of the illustrated example of FIG. 7 identifies the panelists that requested the media. While in the illustrated example the panelist identifier 704 is used, any other information that may be used to identify the panelist may additionally or alternatively be used such as, for example, a mobile device identifier a MAC address), a panelist name, a telephone number, a cookie, etc. While in the illustrated example the requested website 706 is used, any additional or alternative information may be used to identify the media that was requested such as, for example, the vendor identifier, the tag encoded in the media 204, etc.

The timestamp column 710 of the illustrated example of FIG. 7 represents a date and/or time when information associated with the media (e.g., a website) was requested. However, the timestamp column 710 may alternatively represent a time when the requested media was rendered (e.g., displayed, presented, etc.) by the client device 106. Storing a timestamp (e.g., date and/or time) enables analysis of when users request particular media (e.g., to determine issues such as whether users are more likely to request media from a news website (e.g., www.cnn.com) on a weekend, during a weekday, etc.).

Flowcharts representative of example machine readable instructions for implementing the AME server 102 of FIGS. 1-4 are shown in FIGS. 8, 9, 11 and 12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 8, 9, 11 and 12, many other methods of implementing the example AME sever 102 may alternatively be used. For example, the order of execution of the blocks may be changed, and/or some of the blocks described may be changed, eliminated, or combined.

As mentioned above, the example processes of FIGS. 8, 9, 11 and/or 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8, 9, 11 and/or 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
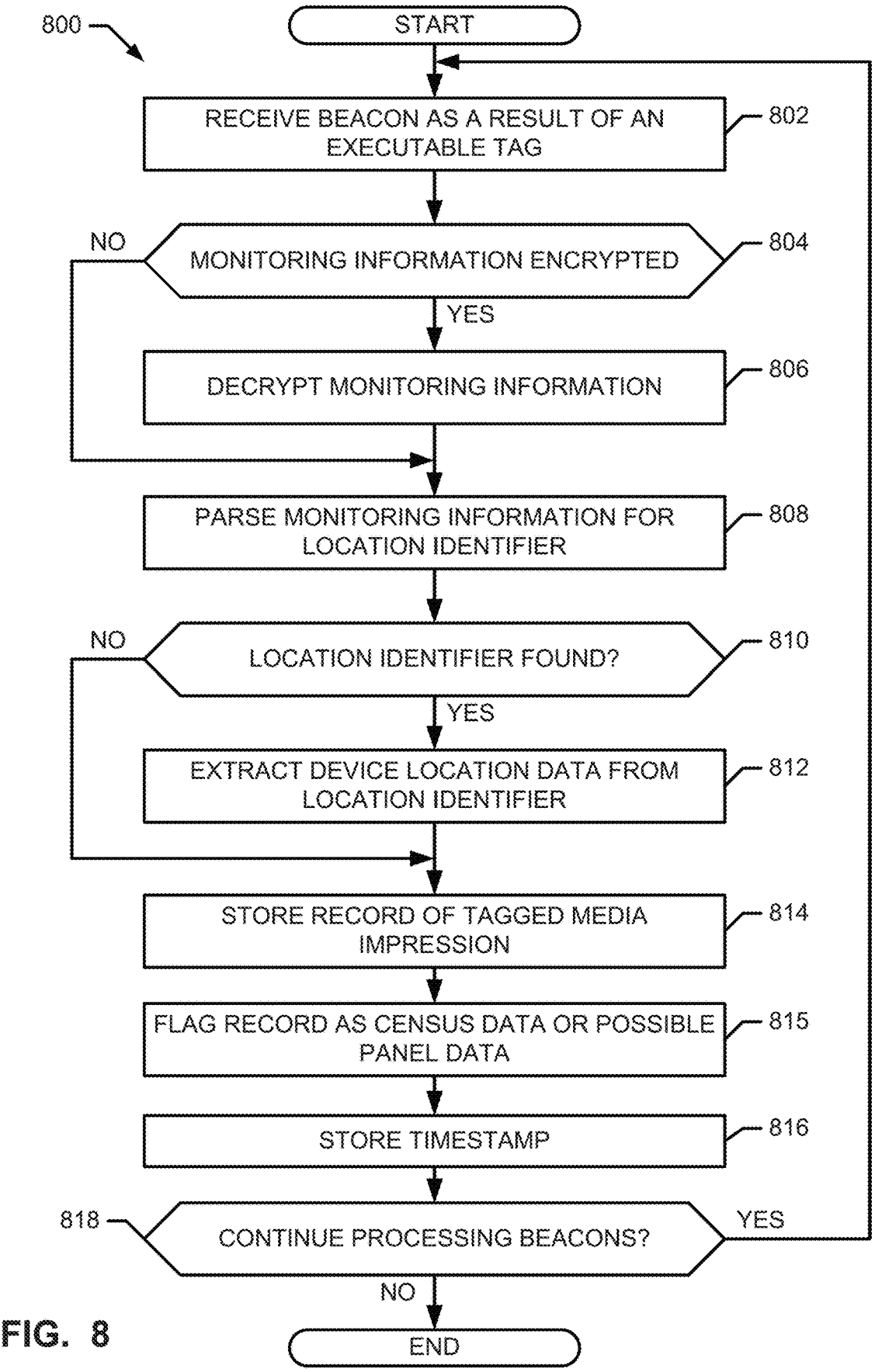
FIG. 8 is a flowchart representative of example machine-readable instructions that may be executed to initiate logging tagged impressions.

The example program of FIG. 8 initiates logging tagged impressions at the example AME server 102 (FIGS. 1-4). The example program of FIG. 8 begins at block 802 when the AME server 102 receives the beacon 210 from the client device 106 in response to the tag 206 (e.g., executable instructions) included in the media 204 being executed by a client device. For example, the beacon handler 402 (FIG. 4) may receive the beacon 210. In some examples, the beacon handler 402 transmits an acknowledgement message in response to receiving the beacon 210 to the device that sent the beacon. In other examples, no response is provided, but the data contained in the beacon is logged.

At block 804, the beacon parser 404 determines whether the monitoring information (e.g., the location identifier 212, the media identifier 214, the timestamp 216, a cookie, etc.) included in the beacon 210 is encrypted. For example, a location identifier 212 included in the beacon 210 may be encrypted using advanced encryption standard (AES) algorithms to protect the privacy of the user. If, at block 804, the beacon parser 404 determines that the monitoring information is encrypted, then, at block 806, the decrypter 406 decrypts the monitoring information. For example, the decrypter 406 may use AES algorithms to decrypt the monitoring information.

If, at block 804, the beacon parser 804 determines the monitoring information is not encrypted or after the decrypter 406 decrypts the monitoring information at block 806, control proceeds to block 808 at which the beacon parser 404 parses the monitoring information included in the beacon 210 for a location identifier 212. If, at block 810, the beacon parser 404 finds the location identifier 212, then, at block 812, the beacon parser 404 extracts a device location included in the location identifier 212. The device location may be used to determine whether to correlate the monitoring information with a panelist.

If, at block 810, the beacon parser 404 does not find a location identifier 12 or after the beacon parser 404 extracts the device location from the location identifier 212 at block 812, control proceeds to block 814 at which the tagged impression logger 408 stores a record of the monitored information provided by the beacon 210. For example, the beacon parser 404 may extract a requested media identifier (e.g., a URL address), a vendor identifier, etc. that may be included in the beacon 210. At block 815, the tagged impression logger 408 flags the record as possible panel data or census data. For example, if the beacon parser 404 extracted the device location from the location identifier 212, the tagged impression logger 408 flags the record as possible panel data. Otherwise, if the beacon parses 404 did not find a location identifier 212, the tagged impression logger 408 flags the record as census data.

At block 816, the time stamper 424 associates a time period (e.g., 1:00 AM Central Standard Time (CST) to 1:01 AM CST) and date (e.g., Jan. 1, 2013) with the tagged media impression. For example, the time stamper 424 may append the period of time and date information to an end of the impression entry in the data store 420 and/or may provide the period of time and date information to the data storer 418.

At block 818, the AME server 102 determines whether to continue processing beacons. If, at block 818, the AME server 102 determines to continue processing beacons (e.g., the beacon handler 402 is continuing to receive beacons as a result of a tag included in a media response), control returns to block 802 to receive another beacon 210 from the client device 210 in response to executing executable instructions in the tag 206 included in the media 204. Otherwise, if, at block 818, the AME server 102 determines to end processing beacons (e.g., due to a server shutdown event, etc.), the example process 800 of FIG. 8 then ends.

Figure 9:
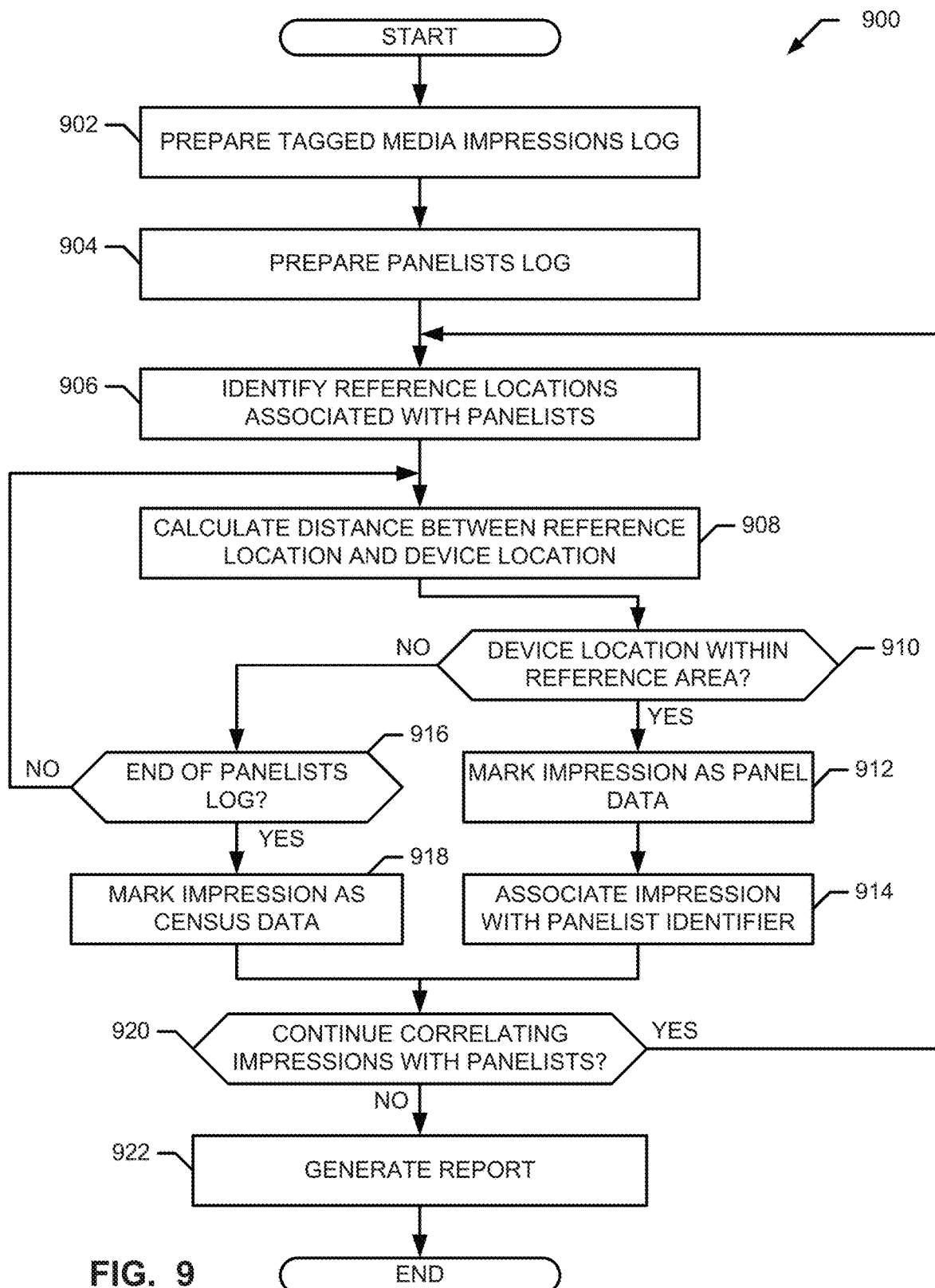
FIG. 9 is a flowchart representative of example machine-readable instructions that be executed to determine whether to correlate tagged media impressions with registered panelists.

The example program 900 of FIG. 9 determines whether to correlate tagged media impression with registered panelists, and marks the tagged media impression as either census data or panel data, accordingly. The example program of FIG. 9 begins at block 902 at which the reporter 422 prepares the tagged media impressions log to be combined with panelist information. For example, the reporter 422 may identify the media impressions in the tagged media impressions log that include device locations based on whether the tagged media impression is flagged as census data or possible panel data. Similarly, at block 904, the reporter 422 prepares the panelists log for combining with the tagged media impressions log. For example, the reporter 422 may utilize the data table 600 to associate the tagged media impression with a panelist identifier.

At block 906, the location handler 410 identifies reference locations associated with the registered panelists to compare to the device location information included in the tagged media impressions log. For example, the location handler 410 may parse the reference locations stored in the data table 600 in the data store 420 and identify the reference locations that have the same (or nearly the same) longitude coordinates or latitude coordinates as the device location information.

At block 908, the distance calculator 412 calculates the distance between a reference location and a device location. If at block 910, the comparator 414 determines that the device location is within a reference area associated with the reference location, then, at block 912, the panelist associator 416 marks the corresponding impression as panel data. At block 914, the panelist associator 416 uses the data table 600 to associate the impression with a panelist identifier. Control then proceeds to block 920 to determine whether to continue correlating impressions with panel data.

Returning to block 910, if the comparator 414 determines that the device location is not within the reference area associated with the reference location, then, at block 916, the AME server 102 determines if it is at the end of the panelists log. For example, the location handler 410 may determine whether there are additional reference locations in the data table 600 to test against the device location information. If, at block 916, the location handler 410 determines it is not at the end of the reference locations to test (e.g., there are additional reference locations in the data table 600), control returns to block 908 to calculate the distance between another reference location and the device location. Otherwise, if, at block 916, the location handler 410 determines it is at the end of the panelists log (e.g., there are no more additional reference locations to test against the device location information), then, at block 918, the panelist associator 416 marks the corresponding impression as census data. Control then proceeds to block 920 to determine whether to continue correlating impressions with panel data.

At block 920, the AME server 102 determines whether to continue correlating impressions with panelists. If, at block 920, the AME server 102 determines to continue correlating impressions with panel data (e.g., the tagged media impressions log includes additional device locations to test, etc.), control returns to block 906 to identify reference locations associated with panel data. Otherwise, if, at block 920, the AME server 102 determines to end correlating impressions with panel data (e.g., there are no additional tagged media impressions to check), then, at block 922, the reporter 422 generates a report and the process 900 of FIG. 9 ends.

Figure 10:
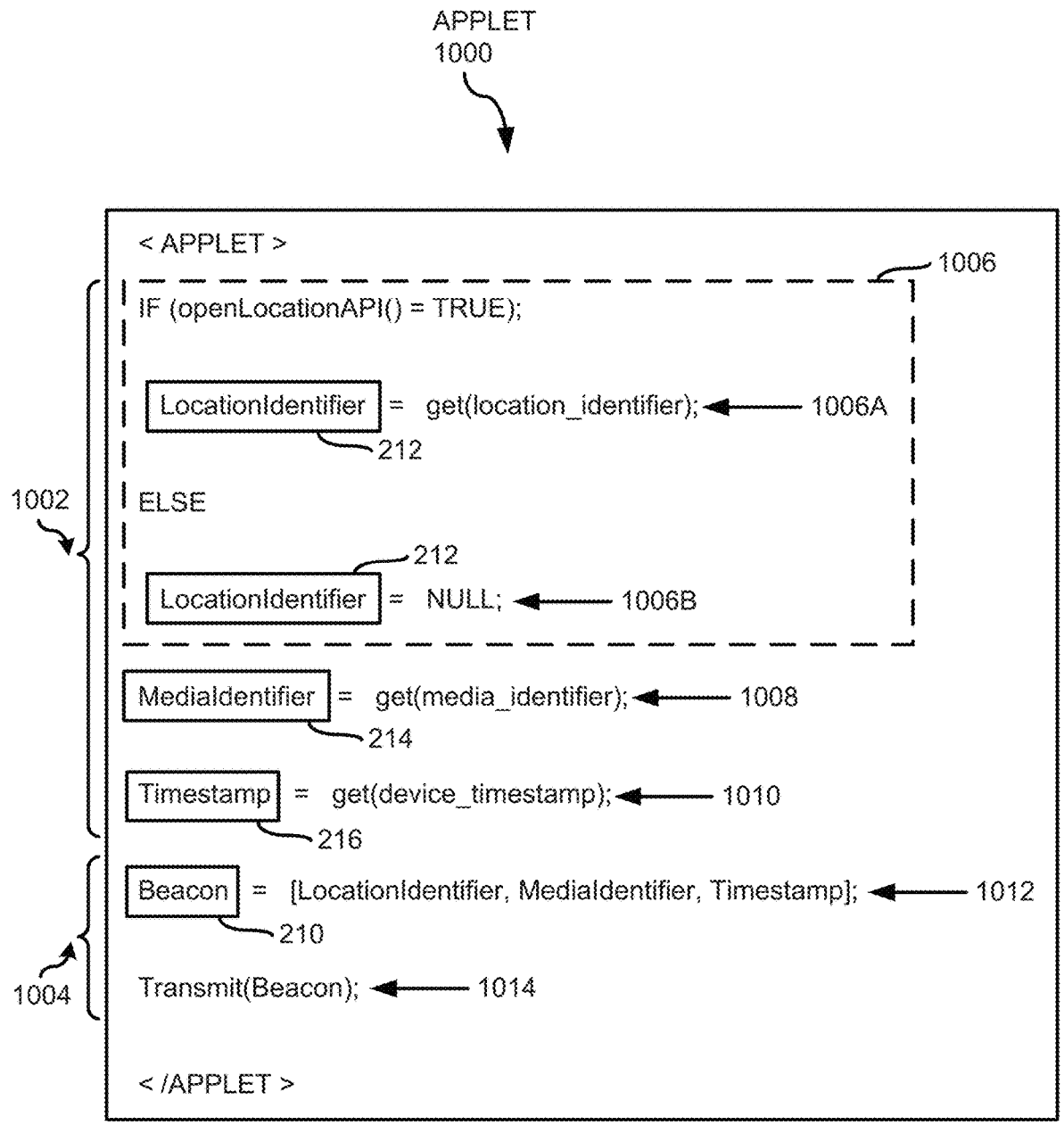
FIG. 10 is an example tag including pseudo code that may be executed to generate a beacon in response to accessing tagged media at a client device

FIG. 10 is an example applet 1000 including pseudo code that may be executed to generate a beacon in response to accessing tagged media at a client device. For example, the applet 1000 may be embedded in the media 204. In the illustrated example of FIG. 10, the applet 1000 includes an example monitoring information retrieval section 1002 and an example beacon transmission section 1004. In the illustrated example, the monitoring information retrieval section 1002 defines the values of the monitoring information (e.g., the location identifier 212, the media identifier 214, the timestamp 216) included in the beacon 210. For example, the monitoring information retrieval section 1002 includes an example location identifier defining block 1006, an example media identifier defining line 1008 and an example timestamp defining line 1010, The example location identifier defining block 1006 of FIG. 10 determines whether the client device 106 has access to a location application programming interface (API) and defines the value for the location identifier 212 accordingly. For example, when the client device 126 has access to the location API, line 1006A retrieves device location information via the location API and stores the value for the location identifier 212. Otherwise, if the client device 126 does not have access to the location API, line 1006B stores a value indicating that no device location is provided (e.g., a null or empty value, "False," "N/A," "0," etc.). In the illustrated example, the media identifier defining line 1008 retrieves media identification information from the media 204 and stores the value for the media identifier 214. In the illustrated example, the timestamp defining line 1010 retrieves date and time information for the media request and stores the value for the timestamp 216.

In the illustrated example of FIG. 10, the example applet 1000 includes the example beacon transmission section 1004 to generate the beacon 210 and to transmit the beacon 210 to, for example, the AME server 102. For example, example beacon generating line 1012 uses the location identifier 212, the media identifier 214 and the timestamp 216 to define the beacon 210. At example beacon transmitting line 1014, the applet 1000 causes the client device 106 to transmit the beacon 210 to, for example, the AME server 102. In some examples, the applet 1000 logs the beacon 210 and transmits one or more beacons 210 at a later time. For example, the applet 1000 may cause the client device 106 to periodically (e.g., every 24 hours) transmit logged beacons 210 to the AME server 102.

Figure 11:
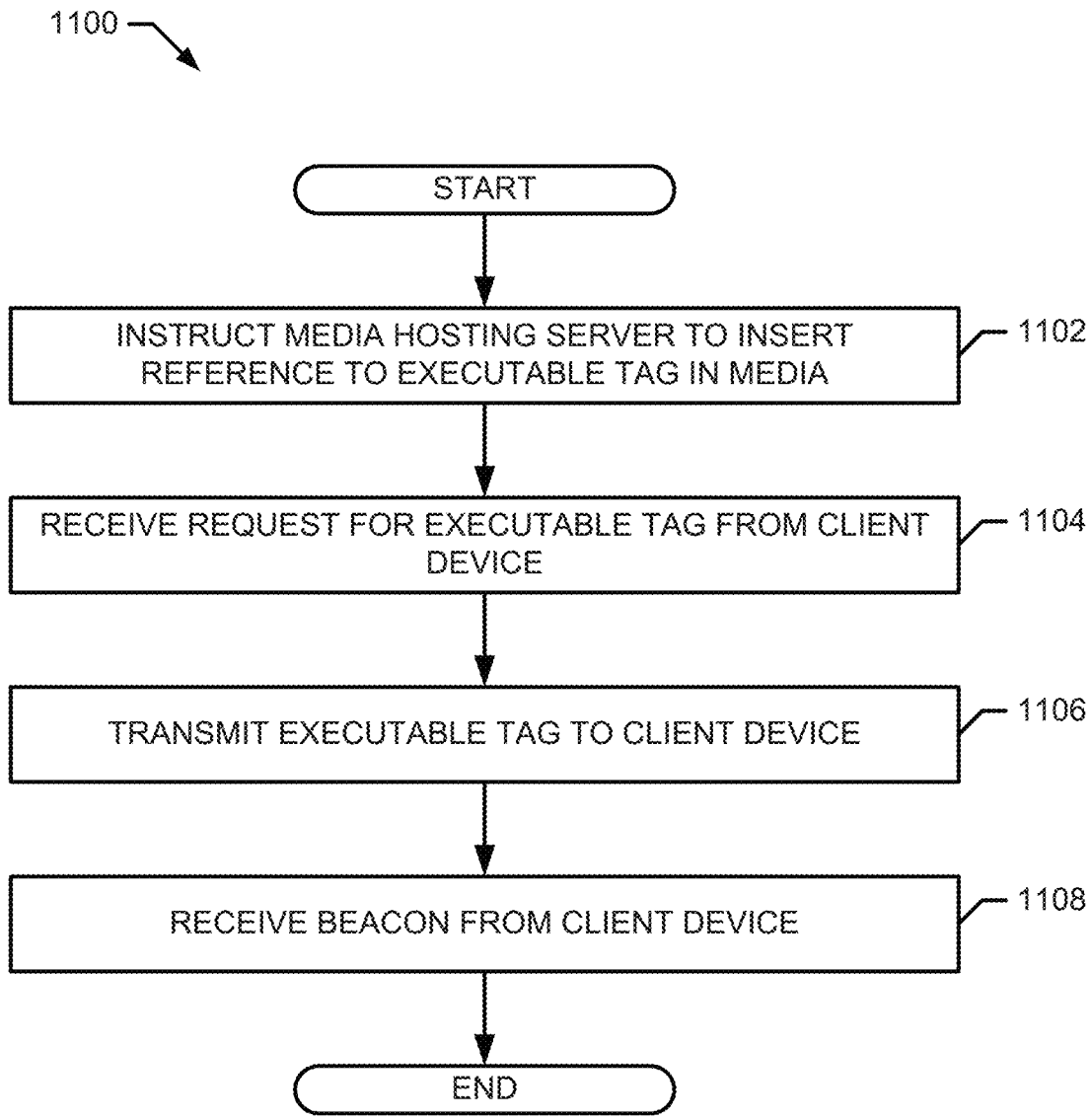
FIG. 11 is a flowchart representative of example machine-readable instructions that may be executed to generate a beacon at a client device.

The example program 1100 of FIG. 11 illustrates an example method that may be executed by a computing device of an audience measurement entity to collect monitoring information from tagged media. The example program of FIG. 11 begins at block 1102 when the tag handler 110 instructs the example media hosting server 104 to insert a reference to an executable tag in the media 204. For example, the tag handler 110 may cause the media hosting server 104 to include a dummy image in the media 204 that the media hosting server 104 desires to monitor. At block 1104 the tag handler 110 receives a request for the executable tag from the client device 106. For example, the media hosting server 104 may respond to a request for media from the client device 106 with the media 204 including the reference. When the client device 106 presents the media 204, the tag handler 110 receives the client device request for the executable tag in response to the reference. In some implementations, block 1104 may not be included. For example, the tag handler 110 may provide the media hosting server 104 the tag 206 along with the reference and, thus, when the client device 106 presents the media 204, the media hosting server 104 receives the client device request for the executable tag in response to execution of the reference. In some other implementations, the tag handler 110 may provide the tag 206 and instruct the media hosting server 104 to embed the tag 206 into the corresponding media 204. Thus, when the client device 106 presents the media 204, no request is made by the client device 106 for an executable tag. Rather, the client device 106 executes the tag 206, which is already present in the media. At block 1106, the tag handler 110 transmits the executable tag to the client device 106. For example, the tag handler 110 may retrieve the executable tag 206 from the data store 420 and communicate the executable tag 206 to the client device 106. An example executable tag 206 is described in further detail below in connection with FIG. 12.

At block 1108, the AME server 102 receives the beacon 210 from the client device 106. For example, the client device 106 generates the beacon 210 in response to executing the executable tag 206 and transmits the beacon 210 to the AME, server 102. The example process of FIG. 11 then ends.

Figure 12:
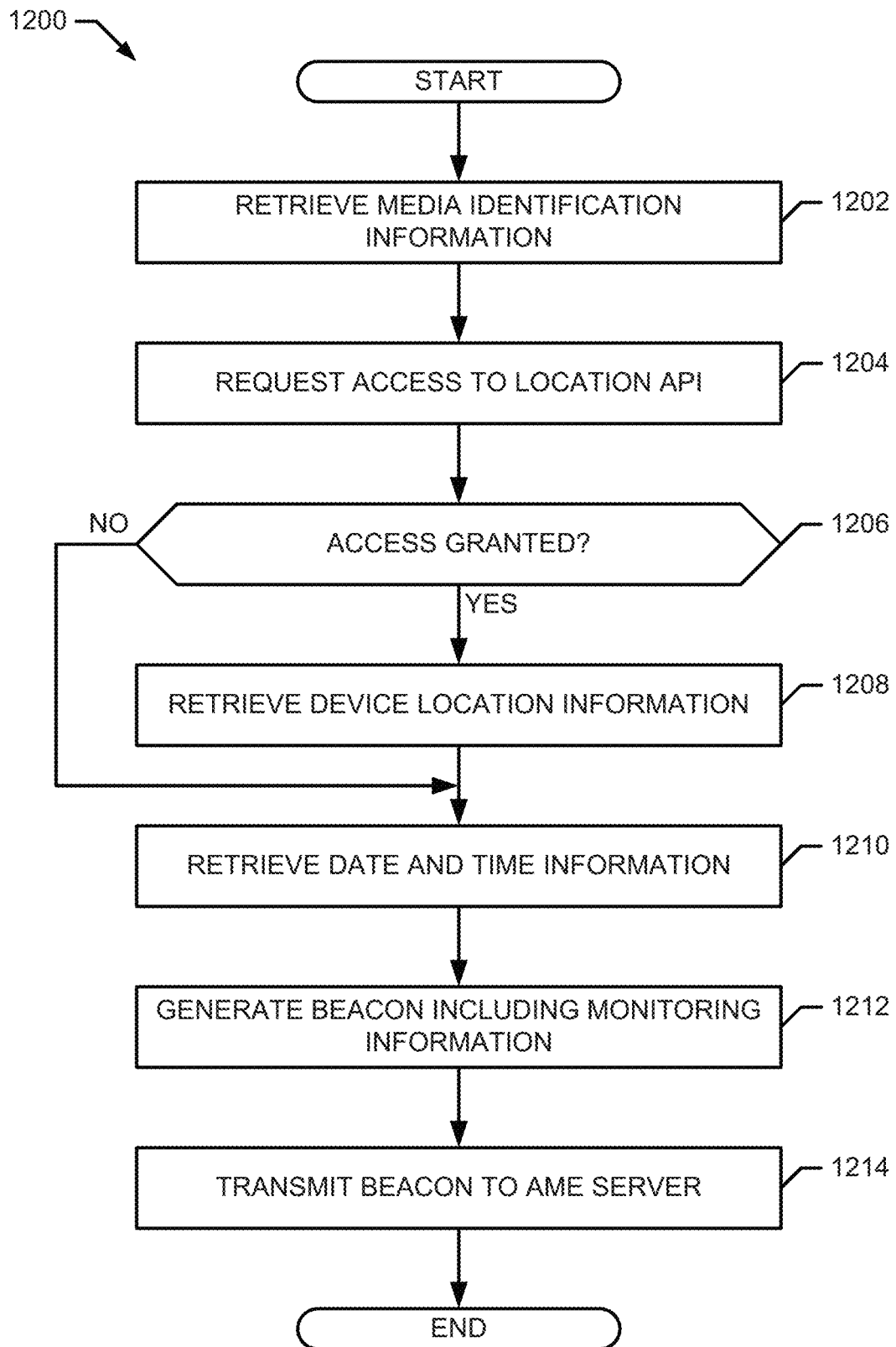
FIG. 12 is a flowchart representative of example machine-readable instructions that may be executed to generate a beacon in response to accessing tagged media at a client device.

The example program 1200 of FIG. 12 illustrated the operation of an example tag in generating an example beacon in response to being executed due to an access to the tagged media 204. Thus, the example program of FIG. 12 may be used to implement the executable tag 206. The example program of FIG. 12 begins at block 1202 when the executable tag 206 causes the client device 106 to retrieve media identification information from the media 204. For example, the media hosting server 104 may encode the media identification information (e.g., a watermark, a signature, metadata, etc.) into the media 204 that the client device 106 decodes when accessing the media 204. At block 1204, the executable tag 206 causes the client device 106 to request access to a location application programming interface (API) of the client device 106. For example, the client device 106 may request permission from a user to access the location API. If, at block 1206, access to the location API is granted, then, at block 1208, the client device 106 retrieves the device location information of the client device via the location API. In some examples, the authorization is granted once and future requests are not needed to access the location API If, at block 1206, access to the location API is not granted (e.g., the user denies the request) or after the client device 106 retrieves the device location information at block 1208, then, at block 1210, the executable tag 206 causes the client device 106 to retrieve date and time information for the media request. For example, the client device 106 may include a calendar and dock that the client device 106 accesses to retrieve the date and time information. At block 1212, the executable tag 206 causes the client device 106 to generate the beacon 210. For example, the beacon 210 may generate the location identifier 212 to identify the device location information, generate the media identifier 214 to identify the media identification information, generate the timestamp 216 to identify the date and time information, and package the location identifier 212, the media identifier 214 and the timestamp 216 into the beacon 210. At block 1214, the executable tag 206 causes the client device 106 to transmit the beacon 210 to the AME server 102. The example process of FIG. 12 then ends.

Figure 13:
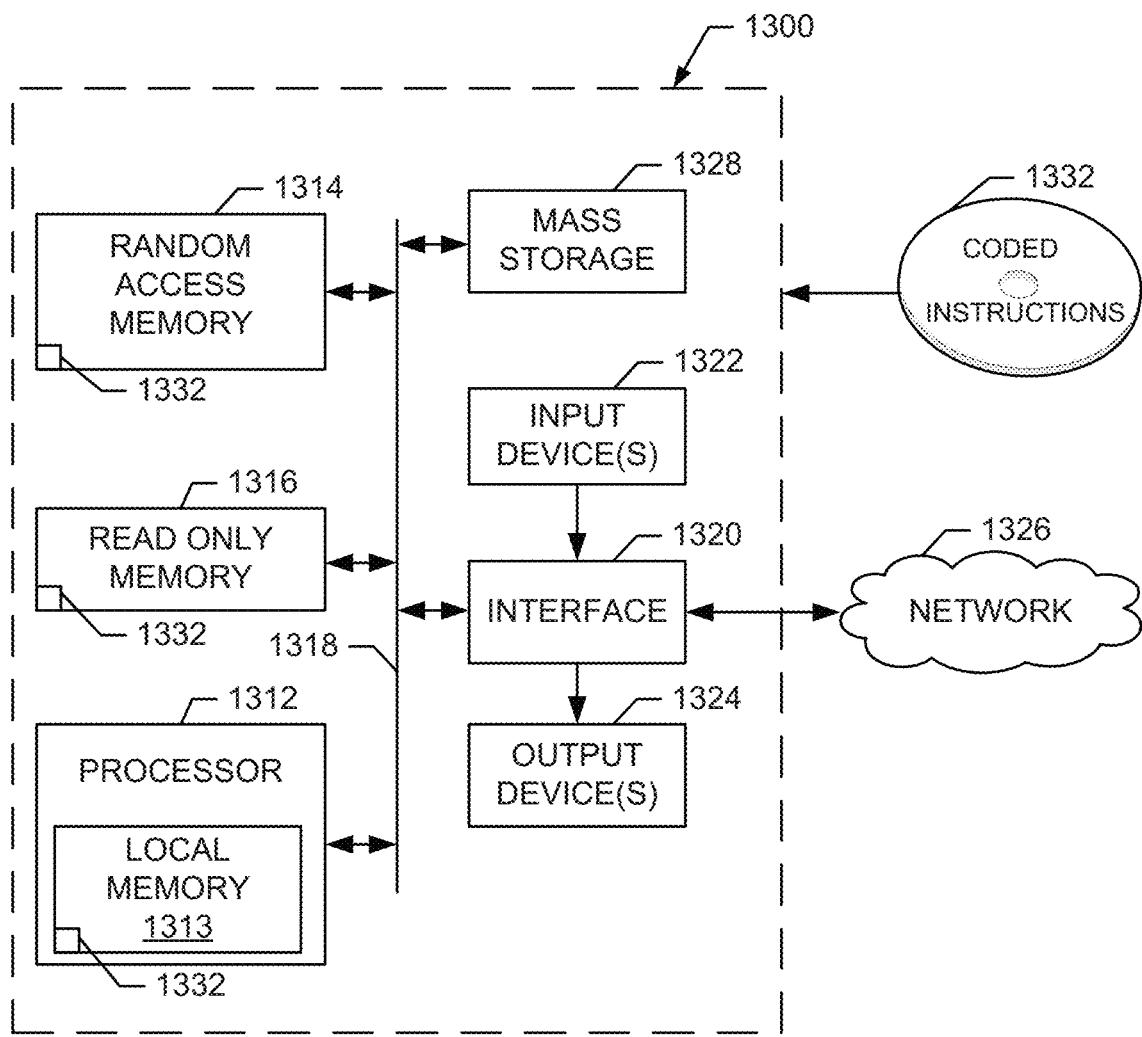
FIG. 13 is a block diagram of an example processing platform capable of executing the example machine-readable instructions 8, 9, 11 and/or 12 to implement the example audience measurement entity server of FIGS. 1-4.

FIG. 13 is a block diagram of an example processor platform 1300 capable of executing the instructions of FIGS. 8, 9, 11 and/or 12 to implement the example AME server 102 of FIGS. 1-4. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326

(e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 8, 9, 11 and/or 12 may be stored in the mass storage device 1328, in the volatile memory 1314, in the non-volatile or memory 1316, and/or on a removable tangible computer readable storage medium such as a CD or DVD.

From the foregoing, it will be appreciated that example methods, apparatus and articles of manufacture have been disclosed which collect monitoring information at a census level, while allowing the census level monitoring information to be correlated with panelist data, and, while protecting the privacy of the panelist and the anonymity of the panelist.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    at least one non-transitory computer readable medium storing instructions; and
    at least one processor to execute the instructions, wherein the instructions, when executed cause the at least one processor to at least:
        access a message sent from a requesting device in response to accessing media that includes a tag causing the requesting device accessing the media to send the message to the at least one processor with an identification of a geographic location of the requesting device and media identifying information;
        identify locations of a plurality of panelist homes;
        compare the geographic location of the requesting device with the locations of the plurality of panelist homes, the locations determined based on sizes of ones of the plurality of panelist homes;
        determine whether the geographic location of the requesting device is within a threshold distance of a first location of a first one of the plurality of panelist homes, the first location determined based on a first size of the first one of the plurality of panelist homes;
        identify a user of the requesting device as a panelist residing at the first one of the panelist homes; and
        associate the media identifying information to panelist data associated with the first one of the panelist homes when the geographic location of the requesting device is within the threshold distance of the first location of the first one of the plurality of panelist homes.

2. The apparatus of claim 1, wherein the media identifying information corresponds to media accessed by the requesting device at the geographic location.

3. The apparatus of claim 1, wherein the tag is a reference to an executable monitoring instruction hosted external to the media.

4. The apparatus of claim 1, wherein the at least one processor is to extract the geographic location of the requesting device from the message.

5. The apparatus of claim 1, wherein a portion of the message is encrypted and the at least one processor is to decrypt the portion of the message.

6. The apparatus of claim 1, wherein the message is a Hypertext Transfer Protocol message.

7. The apparatus of claim 1, wherein the geographic location is determined based on at least one of cellular data, Wi-Fi data, or global positioning data from a global positioning system.

8. A non-transitory computer readable storage medium comprising instructions that, when executed, cause at least one processor to at least:
    access a message sent from a requesting device in response to accessing media that includes a tag causing the requesting device accessing the media to send the message to the at least one processor with an identification of a geographic location of the requesting device and media identifying information;
    identify locations of a plurality of panelist homes;
    compare the geographic location of the requesting device with the locations of the plurality of panelist homes, the locations determined based on sizes of ones of the plurality of panelist homes;
    determine whether the geographic location of the requesting device is within a threshold distance of a first location of a first one of the plurality of panelist homes, the first location determined based on a first size of the first one of the plurality of panelist homes;
    identify a user of the requesting device as a panelist residing at the first one of the panelist homes; and
    associate the media identifying information to panelist data associated with the first one of the panelist homes when the geographic location of the requesting device is within the threshold distance of the first location of the first one of the plurality of panelist homes.

9. The non-transitory computer readable storage medium of claim 8, wherein the media identifying information corresponds to media accessed by the requesting device at the geographic location.

10. The non-transitory computer readable storage medium of claim 8, wherein the tag is a reference to an executable monitoring instruction hosted external to the media.

11. The non-transitory computer readable storage medium of claim 8, wherein the instructions, when executed, cause the at least one processor to extract the geographic location of the requesting device from the message.

12. The non-transitory computer readable storage medium of claim 8, wherein a portion of the message is encrypted, and the instructions, when executed, cause the at least one processor to decrypt the portion of the message.

13. The non-transitory computer readable storage medium of claim 8, wherein the message is a Hypertext Transfer Protocol message.

14. The non-transitory computer readable storage medium of claim 8, wherein the geographic location is determined based on at least one of cellular data, Wi-Fi data, or global positioning data from a global positioning system.

15. A method comprising:
    accessing a message sent from a requesting device in response to accessing media that includes a tag causing the requesting device accessing the media to send the message to at least one processor with an identification of a geographic location of the requesting device and media identifying information;
    identifying locations of a plurality of panelist homes;
    comparing the geographic location of the requesting device with the locations of the plurality of panelist homes, the locations determined based on sizes of ones of the plurality of panelist homes;

determining whether the geographic location of the requesting device is within a threshold distance of a first location of a first one of the plurality of panelist homes, the first location determined based on a first size of the first one of the plurality of panelist homes; and identifying a user of the requesting device as a panelist residing at the first one of the panelist homes;

associating the media identifying information to panelist data associated with the first one of the panelist homes when the geographic location of the requesting device is within the threshold distance of the first location of the first one of the plurality of panelist homes.

16. The method of claim 15, wherein the media identifying information corresponds to media accessed by the requesting device at the geographic location.

17. The method of claim 15, wherein the tag is a reference to an executable monitoring instruction hosted external to the media.

18. The method of claim 15, further including extracting the geographic location of the requesting device from the message.

19. The method of claim 15, wherein a portion of the message is encrypted, and further including decrypting the portion of the message.

20. The method of claim 15, wherein the geographic location is determined based on at least one of cellular data, Wi-Fi data, or global positioning data from a global positioning system.

21. The apparatus of claim 1, wherein the sizes are determined based on at least one of perimeters of the plurality of panelist homes or radii of the plurality of panelist homes.

22. The apparatus of claim 1, wherein the first size is determined based on an orientation of walls of the first one of the plurality of panelist homes, the walls defining the first one of the plurality of panelist homes.

23. The apparatus of claim 22, wherein the threshold distance is determined based on at least one of a perimeter of the first one of the plurality of panelist homes, or a radius of the first one of the plurality of panelist homes, or the orientation of the walls.

* * * * *